United States Patent
Ali

(10) Patent No.: US 11,148,555 B2
(45) Date of Patent: Oct. 19, 2021

(54) SYSTEM AND METHOD FOR SECURING AND MONITORING A CHILD PLACED IN A CAR SEAT OF A VEHICLE

(71) Applicant: Firasat Ali, Cupertino, CA (US)

(72) Inventor: Firasat Ali, Cupertino, CA (US)

( * ) Notice: Subject to any disclaimer, the term of this patent is extended or adjusted under 35 U.S.C. 154(b) by 151 days.

(21) Appl. No.: 15/940,508

(22) Filed: Mar. 29, 2018

(65) Prior Publication Data

US 2018/0281627 A1    Oct. 4, 2018

Related U.S. Application Data

(60) Provisional application No. 62/480,681, filed on Apr. 3, 2017.

(51) Int. Cl.
*B60N 2/02* (2006.01)
*B60N 2/00* (2006.01)
(Continued)

(52) U.S. Cl.
CPC ......... *B60N 2/0276* (2013.01); *B60N 2/002* (2013.01); *B60N 2/0248* (2013.01);
(Continued)

(58) Field of Classification Search
None
See application file for complete search history.

(56) References Cited

U.S. PATENT DOCUMENTS

| 7,542,836 B1* | 6/2009 | Norton | B60R 21/01532 280/728.1 |
| 7,542,936 B1* | 6/2009 | Jacob | G06Q 20/102 705/37 |

(Continued)

*Primary Examiner* — Peter D Nolan
*Assistant Examiner* — Demetra R Smith-Stewart

(57) ABSTRACT

A car seat system for automatically displacing the movable components of the car seat. The car seat including sensors and a computing module to detect the measurements of a child placed in the car seat. The car seat system determines the current position of the movable components and displaces the movable components automatically based on the child's measurements or a desired amount. The car seat system automatically learns child's behaviors when the child is placed in the car seat. The car seat system learns schedules utilized by the child, routes taken by the driver of the car, and other data over a period of time. The behavioral, scheduling, routing, and other data obtained is stored by the car seat system and utilized to enhance the safety and comfortability of the child during a car ride. The car seat system also determines thickness of clothing worn by the child while placed in the car seat and adjusts the shoulder belts to accommodate for the clothing while providing a snug fit of the shoulder belts that fall within safety recommendations. The car seat also auto reclines to a desired angle and also rotates about itself to face the door. The car seat system includes an auto-incident detection mode. In this mode, the system detects an incident, such as an accident, hard braking, or another hazard, and automatically displaces the features in the car seat to make the car seat secure during the crash minimizing the effect of the incident on the child. The car seat also includes pretensioners and motors to release, pull back, and lock the car seat belts.

29 Claims, 17 Drawing Sheets

(51) Int. Cl.
    *B60N 2/28*     (2006.01)
    *B60R 22/10*     (2006.01)
    *B60R 22/48*     (2006.01)
    *B60R 22/343*     (2006.01)
    *B60N 2/20*     (2006.01)

(52) U.S. Cl.
    CPC ......... *B60N 2/2812* (2013.01); *B60N 2/2821* (2013.01); *B60N 2/2851* (2013.01); *B60N 2/2869* (2013.01); *B60N 2/2872* (2013.01); *B60N 2/2875* (2013.01); *B60N 2/2884* (2013.01); *B60R 22/105* (2013.01); *B60R 22/343* (2013.01); *B60R 22/48* (2013.01); *B60N 2/20* (2013.01); *B60N 2002/0268* (2013.01); *B60N 2002/2815* (2013.01); *B60R 2022/4858* (2013.01)

(56) References Cited

U.S. PATENT DOCUMENTS

| | | | | |
|---|---|---|---|---|
| 10,052,982 | B1* | 8/2018 | Danley | B60N 2/0232 |
| 2004/0095005 | A1* | 5/2004 | Dukes | B60N 2/0232 |
| | | | | 297/256.13 |
| 2005/0280297 | A1* | 12/2005 | Patterson | B60N 2/2809 |
| | | | | 297/217.4 |
| 2006/0082129 | A1* | 4/2006 | Dingman | B60N 2/2806 |
| | | | | 280/807 |
| 2009/0066065 | A1* | 3/2009 | Breed | B60R 25/257 |
| | | | | 280/735 |
| 2011/0289687 | A1* | 12/2011 | Rieber | B60N 2/882 |
| | | | | 5/636 |
| 2016/0023579 | A1* | 1/2016 | Balensiefer, II | B60N 2/2806 |
| | | | | 297/256.15 |
| 2016/0176409 | A1* | 6/2016 | Kirsch | A61M 21/02 |
| | | | | 701/37 |
| 2017/0240022 | A1* | 8/2017 | Ireri | B60H 1/00742 |

* cited by examiner

Fig. 1A
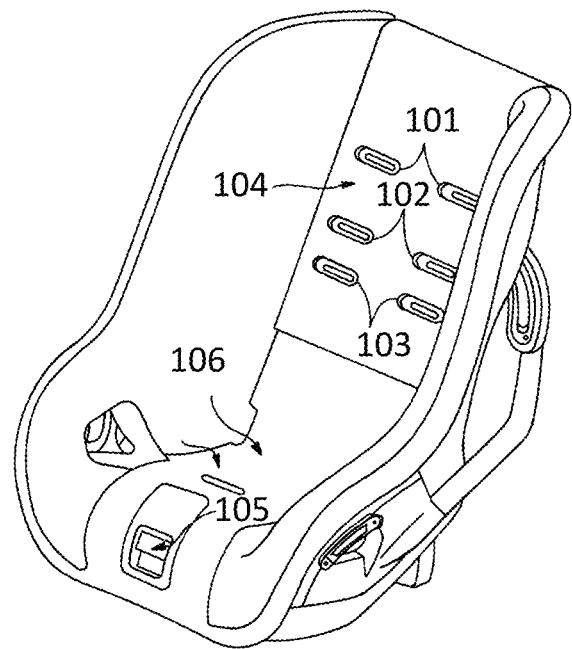
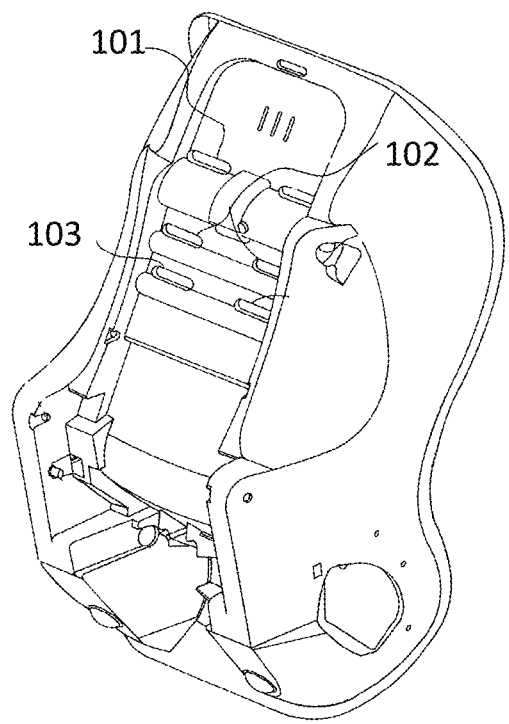
Fig. 1B

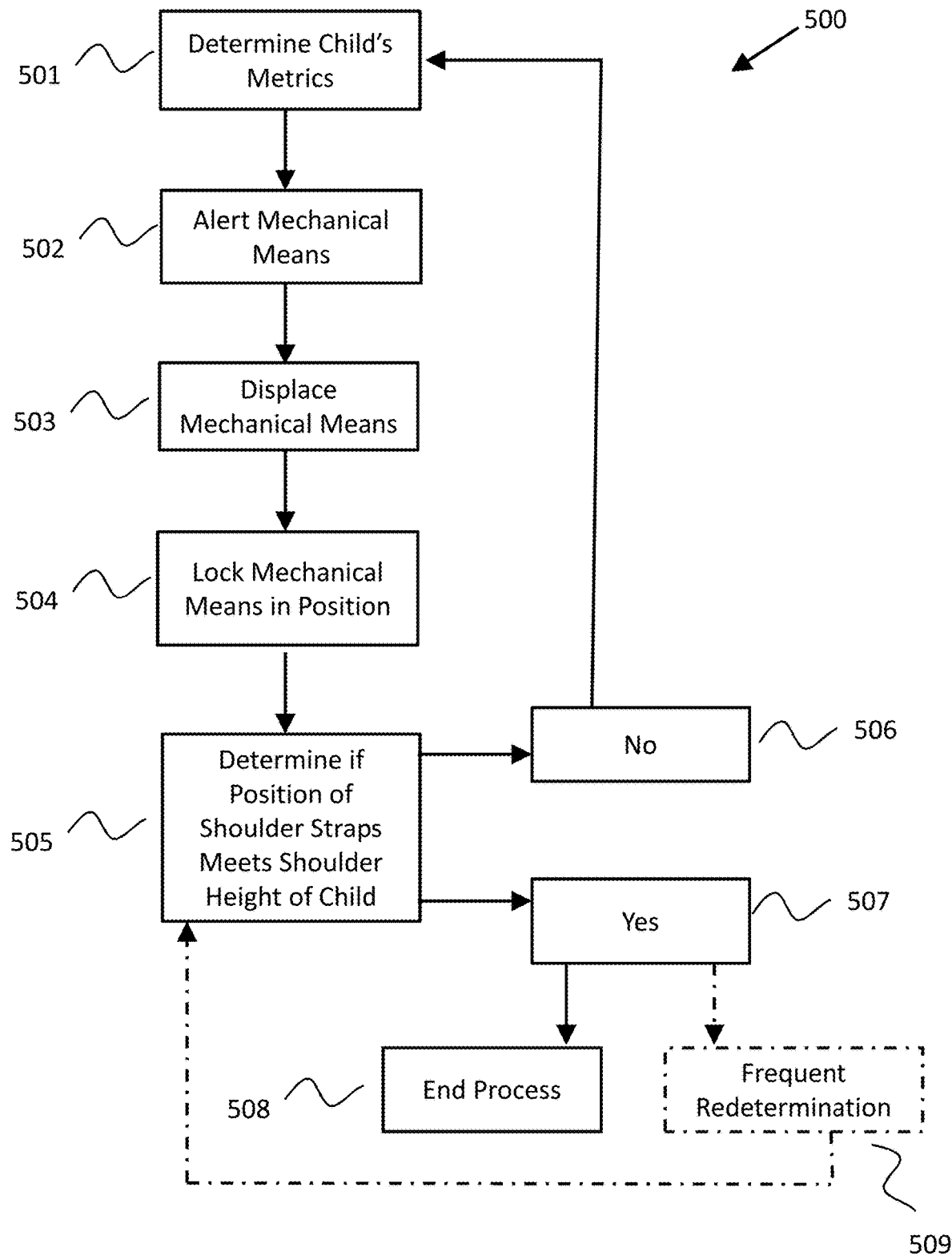

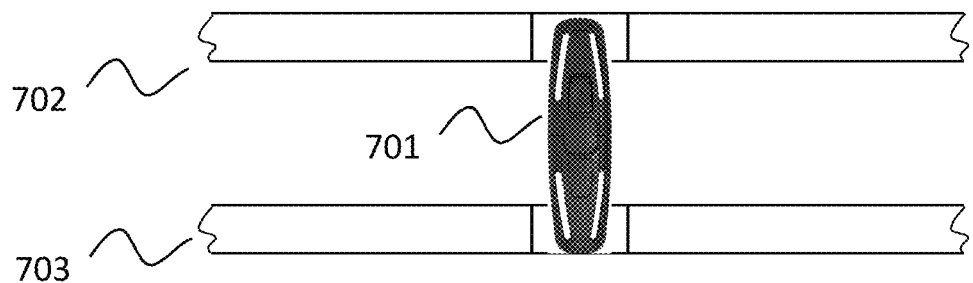
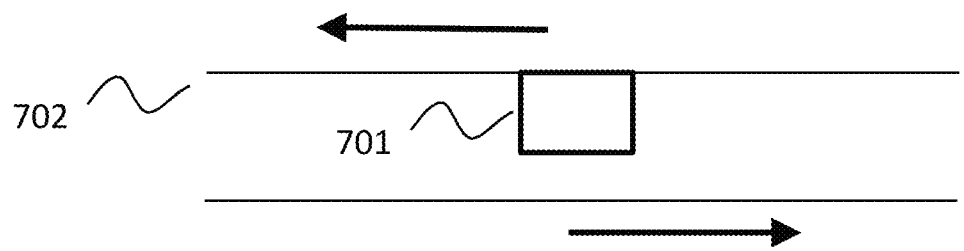
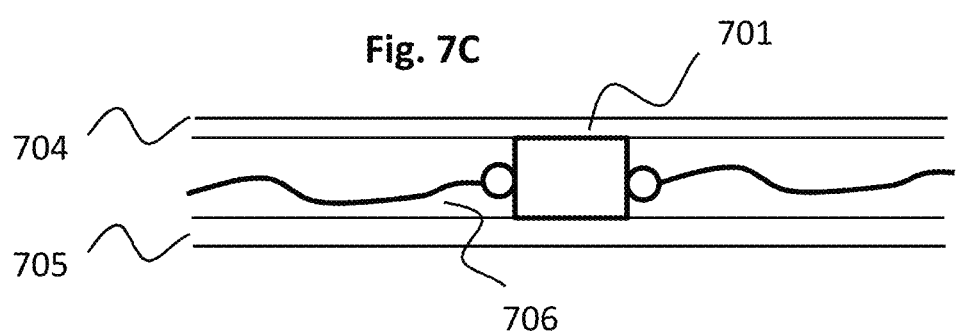

Fig. 8A
Fig. 8B
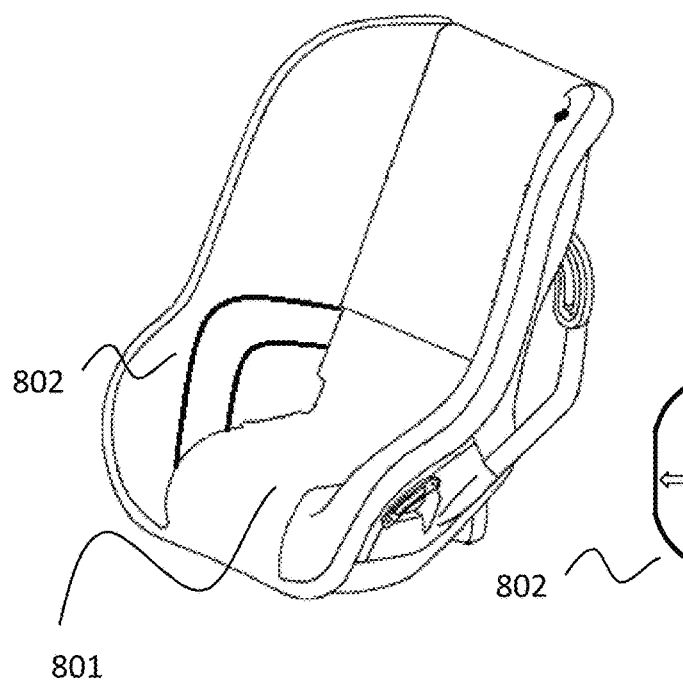
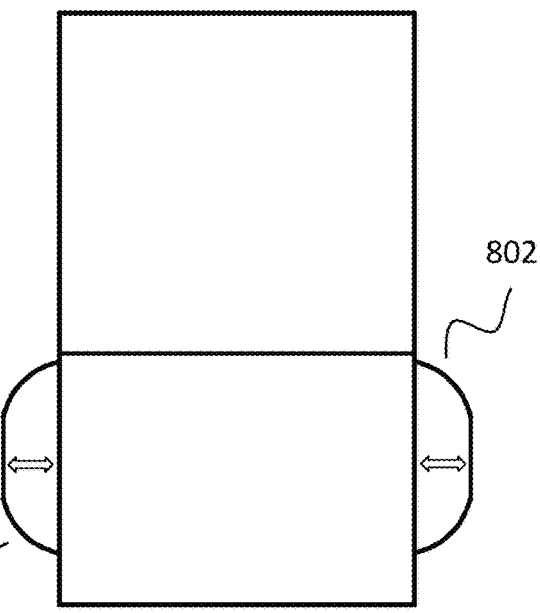

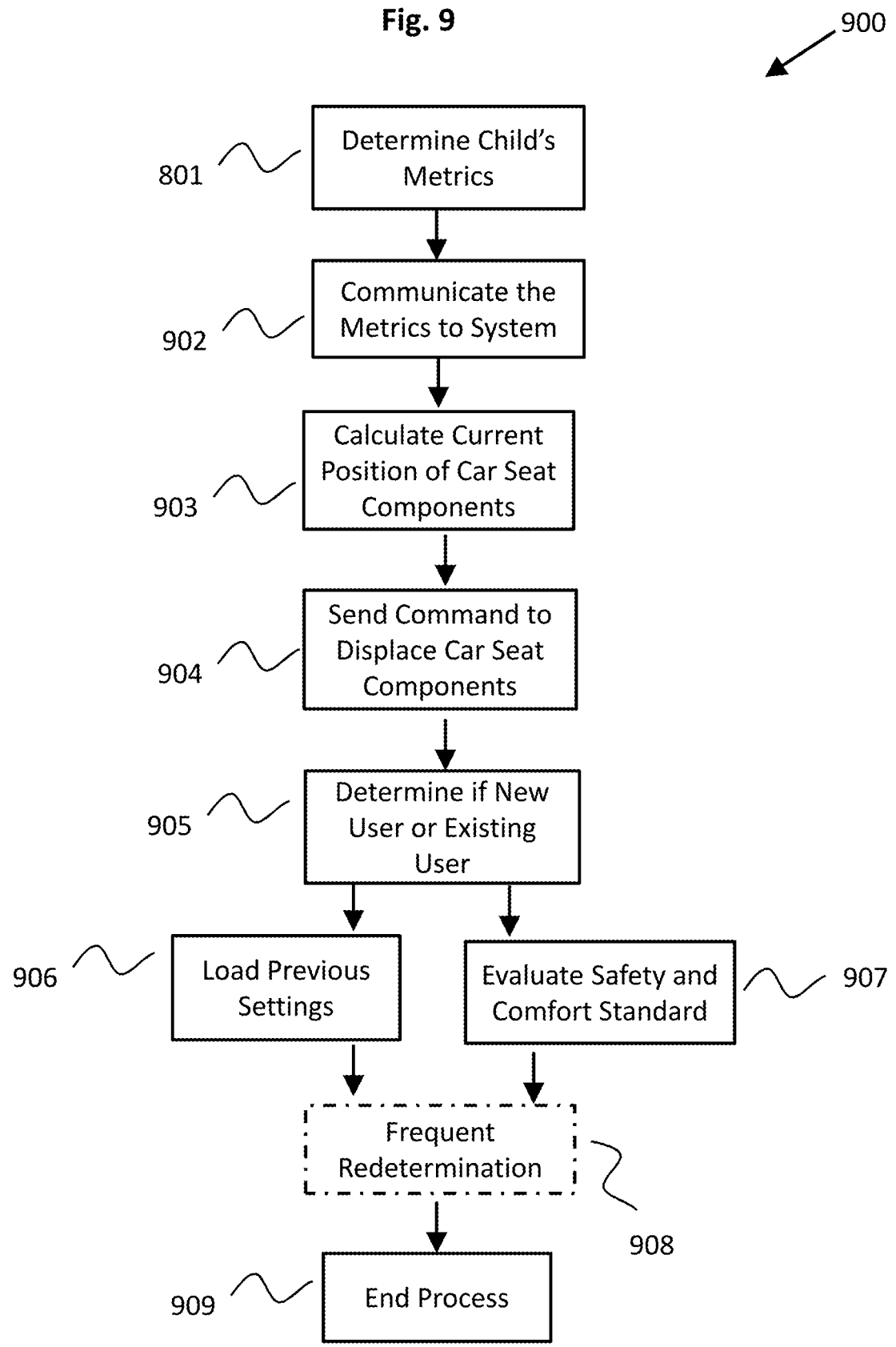

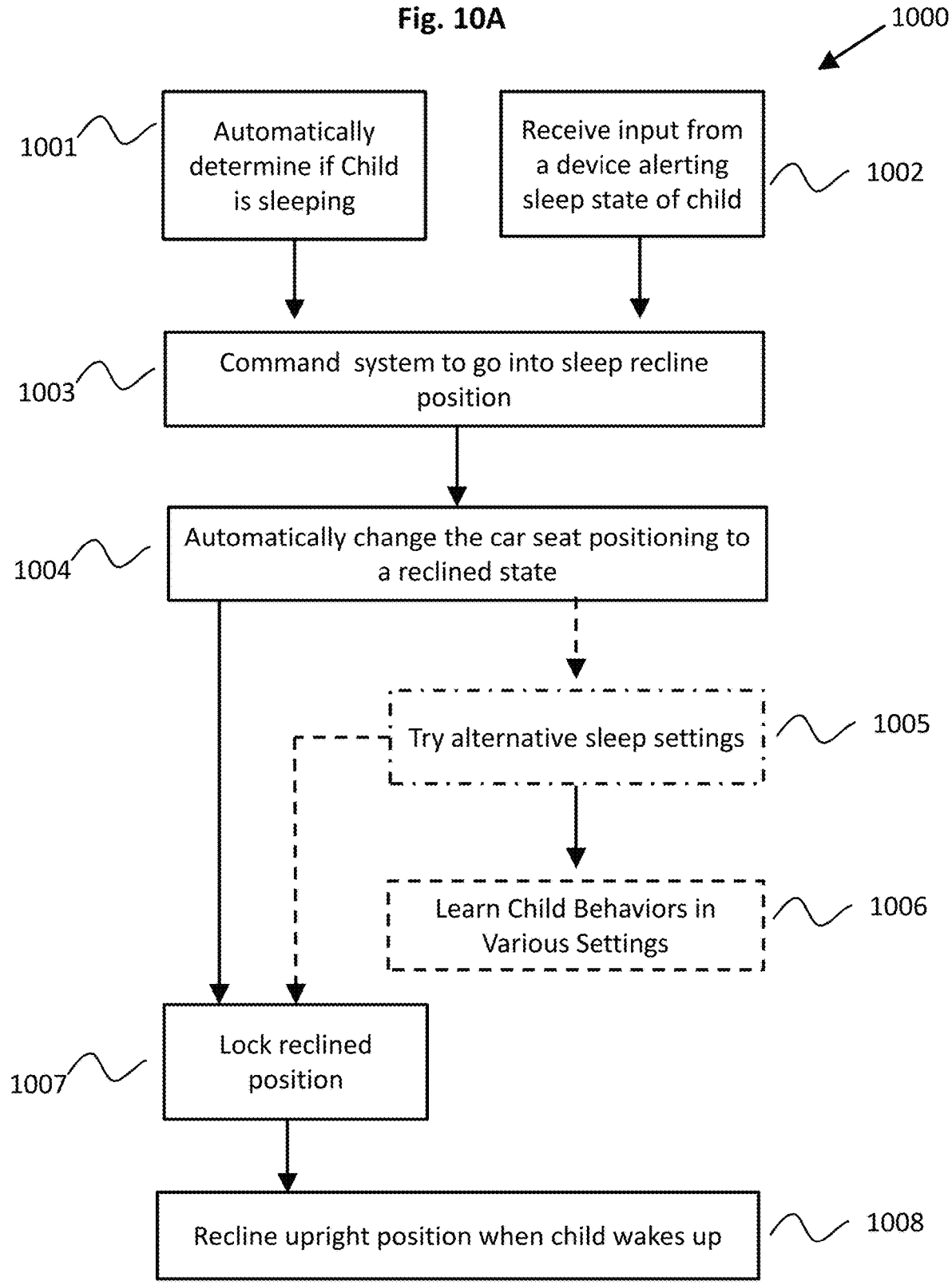

Fig. 10 B
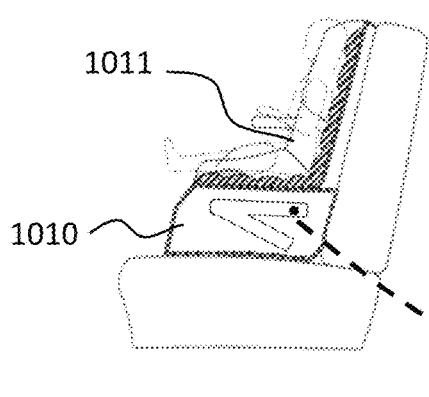
Fig. 10 C
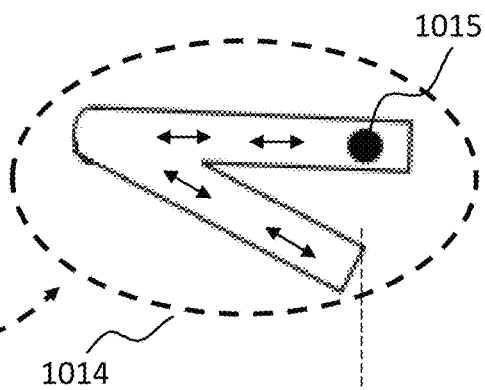
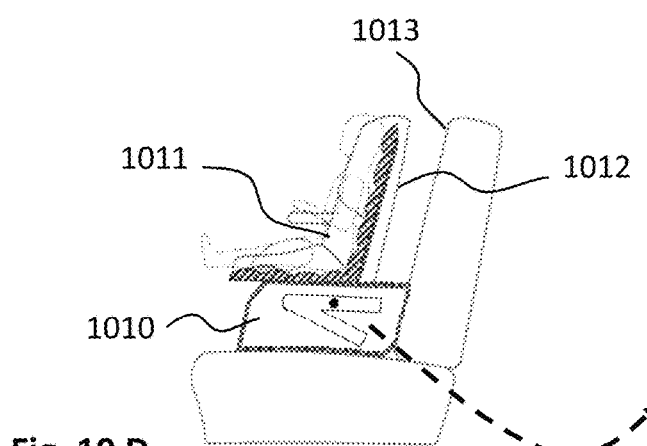
Fig. 10 D
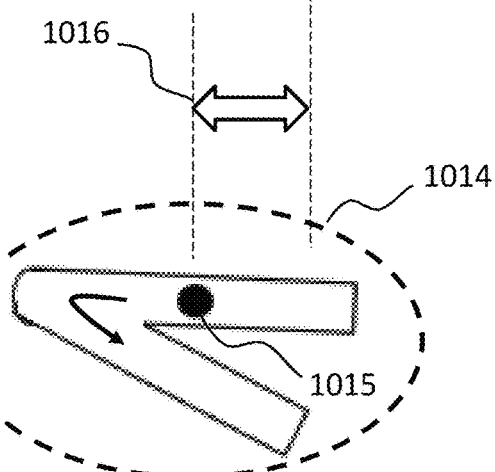
Fig. 10E
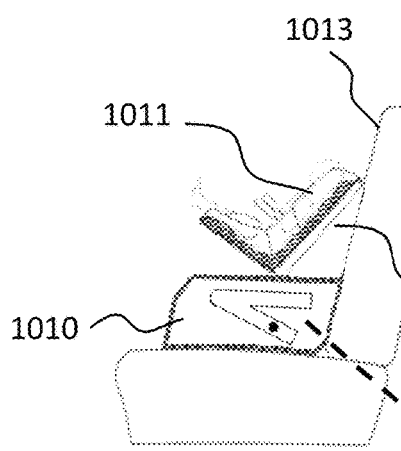
Fig. 10 F
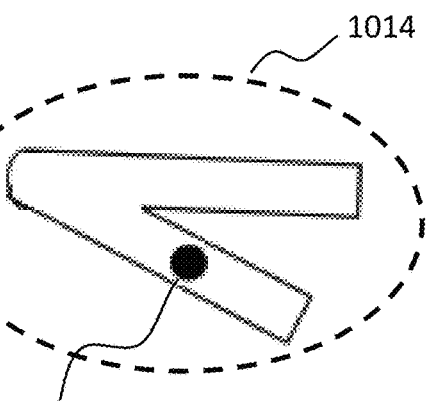
Fig. 10 G

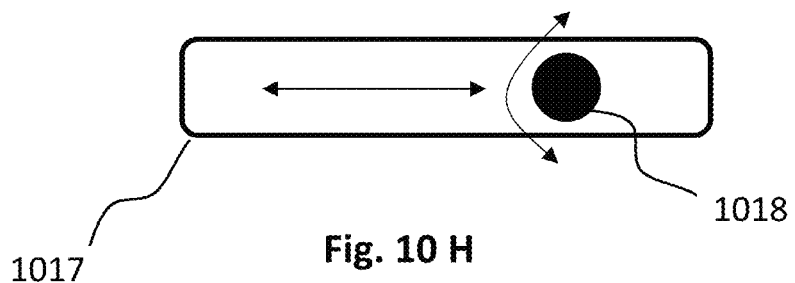
Fig. 10 H
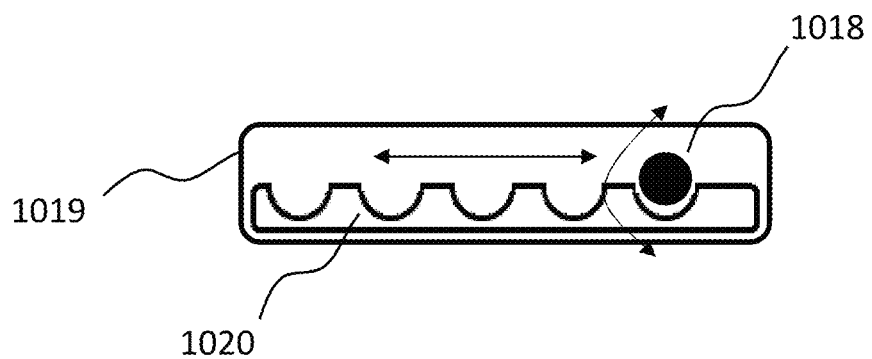
Fig. 10 I
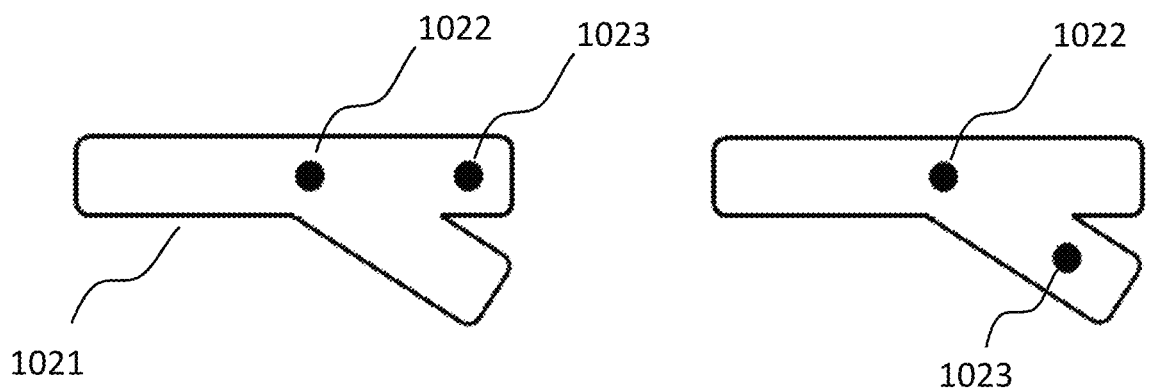
Fig. 10 J
Fig. 10 K

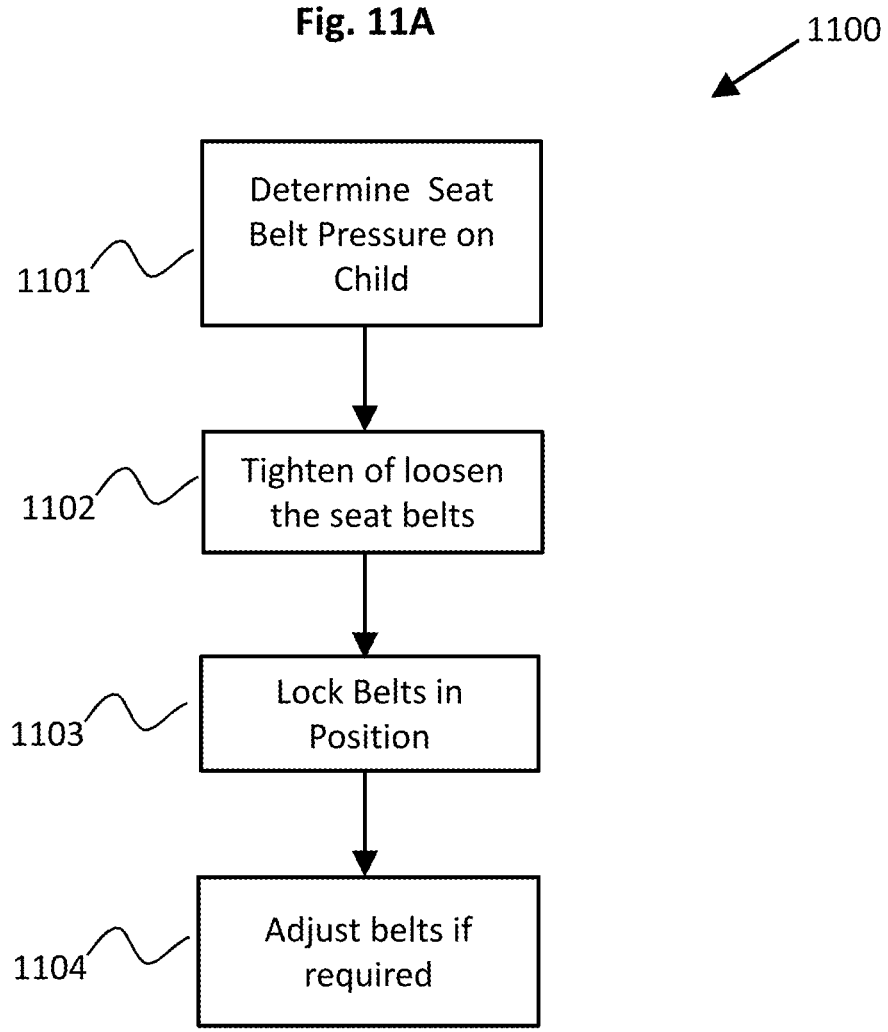

Fig. 12A
Fig. 12B
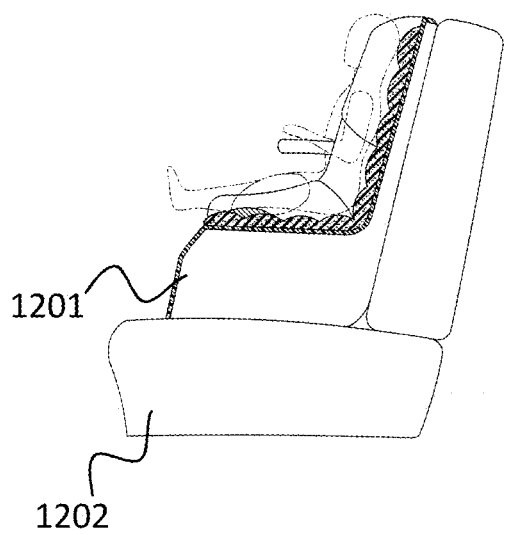
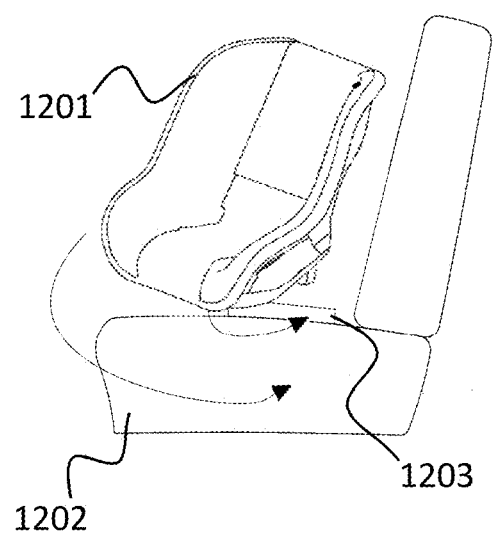

SYSTEM AND METHOD FOR SECURING AND MONITORING A CHILD PLACED IN A CAR SEAT OF A VEHICLE

PRIORITY TO RELATED APPLICATION

The present application claims priority from a United States Provisional Patent Application, App. No. 62/480,681, titled "System and Method for Securing and Monitoring a Child Placed in a Car Seat of a Vehicle" and filed on Apr. 3, 2017, which is also hereby incorporated by reference.

COPYRIGHT NOTICE

A portion of the disclosure of this patent document contains material that may be subject to copyright protection. The copyright owner has no objection to the facsimile reproduction by anyone of the patent document or the patent disclosure as it appears in the Patent and Trademark Office patent file or records, but otherwise reserves all copyright rights.

TECHNICAL FIELD

The present application relates to securing and monitoring a child that is placed in a car seat of a vehicle. More specifically, the present application relates to an automated system for securing the child in a car seat and displacing components of the car seat to safely and comfortably secure a child in the car seat. The present application also relates to features that allow for providing a more comfortable car seat experience for the child.

BACKGROUND

Car seats for children being transported in automobiles are not only essential to the child's security but also a legal requirement in most states and countries. Car seats, whether infant car seats, or booster seats for older children, or an all-in-one car seat that converts from infant to booster, are designed to withstand impact of an automobile accident to the child sitting in the car seat and also prevent the child from flying out of the automobile when the automobile braking is applied. Having a child properly secured in a car seat can and has saved many children's lives during automobile accidents. Although great advances have been made to car seats in the areas of keeping children safe during an automobile impact, in all other areas outside of impact safety, most of the car seats still operate using very old technology and mechanical supports. As such there is a need for the present invention.

FIGS. 1A and 1B depict a prior art car seat. FIG. 1A shows the front side of the car seat and FIG. 1B shows the back side of the car seat. The prior art car seat provides a manual method for adjusting the height of the shoulder seat belt of the car seat. Many child car seats are formed to include several sets of shoulder belt-receiving apertures in a back wall of the car seat so that the car seat can be adjusted by a user to restrain children of different sizes. These pairs of shoulder belt-receiving apertures are placed at various vertical distances from each other. Typically, prior art car seats have included three sets of apertures 101, 102, and 103 that are located in the back-support region 104 of the car seat. Some car seats have included more than three sets.

In the case of an infant, or a child with a lower height, the lower vertical pair of apertures 103 allows the two shoulder belts to pass through from the front side of the car seat to the back side of the car seat and then be recoupled to the car seat's harness. Likewise, the shoulder belt-receiving apertures that are at highest vertical location 101 of the car seat allow for older or taller children whose shoulder height matches or is near the higher placed vertical shoulder belt-receiving aperture.

In order to do the height adjustment, whether it be to address the growth of a child and their height increases, or as a smaller child is replaced with a taller child in the car seat, the caregiver is required to undergo a laborious method to remove the seat belt from one or more locations from the car seat to make the height adjustment. In some instances, the caregiver must disconnect the shoulder belts from the main harness for the two shoulder belts, remove them from the lower apertures by extracting them from the front of the car seat, and repeat the belt installation procedure by passing the shoulder belts through the higher sets of belt-receiving apertures formed in a higher portion of the back side of the car seat and then connect it back to the main harness. Additionally, the caregiver must also readjust the front portion of the belts through a latch 105 located at the base 106 of the car seat such that it is not too tightened due to the pulling of the belts by repositioning them to a higher location. This removal and re-installation is very cumbersome and not easily accomplished. Further, it requires the removal of the car seat from the attachments to the car such that the caregiver can turn the car seat to its back side in order to access the harness and the apertures for the height adjustment thereby requiring removal of car seat and reattachment of both the car seat and the shoulder belts every time a new child is placed in the car.

Other attempts, like in U.S. Pat. No. 6,030,047, allow height adjustment of the shoulder belts by include having a slider-type belt support bar at the back side of the car seat instead of the apertures mentioned above. The slider-type mechanism includes predefined indentations in which the slider-type belt support bar can fit and be locked in. In operation, the caregiver must remove the car seat from the attachment to the car, turn the car seat so they can access the backside of the car seat, and then manually pull the slider-type belt support bar to a higher predefined indentation and then place it in that indentation to be locked. This upward and downward manual movement of the slider-type belt support bar allows for the height adjustment. This method is also cumbersome and requires removal of car seat and manual adjustment of the slider-type belt support bar.

Car seats also include a middle-section clip or a safety lock that ties the two shoulder belts together across the child's chest area. However, positioning of the middle-section clip is often misplaced either too high or often too low across the child's stomach area. The caregiver constantly has to manually adjust the middle-section clip to keep it around child's armpit length and often most caregivers not knowing the recommended position of the middle-section clip either leave it across child's stomach area or other locations causing a hazard to the child's safety due to improper placement.

Current car seats have yet another problem. Seat belts in these car seats often need to be adjusted and tightened to child's chest and waist areas so that there is no or little gap between the shoulder belt and the child. Children change clothing every day and the clothing thickness varies from a body tight and thin clothing to a very thick jacket to various layers of thermal or other layering during winter. Parents often need to adjust the belt by pulling the strap and have to undo a sophisticated locking mechanism which is not easy to reach and hidden such that a child may not loosen the belt on their own. This forces parents to often change the seat belt settings by tightening and loosening the belt which causes time and effort, especially in areas where the weather changes take place frequently and requires a jacket to be on and off several times a day or during winter months. Further, if during a ride or at a stop the child needs to take off their jacket, thereby creating an additional gap between the shoulder belt and the child's chest that was created by the removal of the jacket, the parent would need to park the car, get out of the car and come around to the back seat and adjust the belt for appropriate pressure.

These and other problems make the current car seat difficult to maneuver and adjust when needed.

SUMMARY OF THE INVENTION

In one embodiment of the invention, a child car seat having restraining features is disclosed. The car seat includes sensors for obtaining data of the car seat components as well as data on the child placed in the car seat. The data may include measuring the child's metrics, such as shoulder height, waist size, chest width, neck height and width, and head placement.

The car seat includes movable means to displace the movable components of the car seat. These movable components include shoulder belts and head rest. The car seat system obtains data of the measurements of the car seat as well as the child's measurements and automatically adjusts the car seat components, such as shoulder belt height, such that it is properly placed both for safety and comfort of the child.

The car seat system has an auto learning feature that detects patterns and habits of the child. The auto learning system signals the car seat system to displace car seat components in a manner that it predicts would help keep the child safe and comfortable.

The car seat system also detects sleep state of the child and reclines the car seat automatically when a sleep state is detected. The reclining positions are programmable. The system also detects whether the child is sleeping to automatically recline the car seat to a more comfortable position for sleeping. The features and automation allows the caregiver to automatically adjust the car seat setting without having the caregiver do perform the adjustments manually.

The car seat system also detects the thickness of a child's clothing and adjusts the tension of the shoulder belts accordingly.

All the movable features of the car seat are programmable. The car seat includes a communication module that is capable of communicating with authorized mobile devices as well as the automobile's computer and automobile's display screen.

The car seat also include a rotate feature. This feature allows the base of the car seat to stay forward facing while the top of the car seat, which is coupled to the base, is allowed to be rotated towards the car door thereby facilitating easy removal and placement of the child.

The car seat system includes an auto-incident detection mode. In this mode, the system detects an incident, such as an accident, hard braking, or another hazard, and automatically displaces the features in the car seat to make the car seat secure during the crash minimizing the effect of the incident on the child.

BRIEF DESCRIPTION OF DRAWINGS

The foregoing summary, as well as the following detailed description, will be better understood when read in conjunction with the appended drawings. For the purpose of illustrating the invention, there are shown in the drawings examples that are presently preferred. It should be understood, however, that the invention is not limited to the precise arrangements and instrumentalities shown. In the drawings:

FIGS. 1A and 1B illustrates a prior art car seat where FIG. 1*a* shows the front side and FIG. 1*b* shows the back side of the car seat;

FIG. 3A shows the child in a sitting up position and FIG. 3B shows the child in an inclined position;

FIG. 5 illustrates a method for adjusting the height of the car seat's shoulder belts;

FIG. 7A illustrates a detailed view of the middle-section clip coupled with a pair of shoulder belts;

FIG. 7B illustrates a method of displacing the middle-section clip;

FIG. 7C illustrates another method of displacing the middle-section clip;

FIG. 8A illustrates an isometric view of the front of the car seat and FIG. 8B illustrates a block diagram of the front view of the car seat;

FIG. 9 illustrates a complete automation system for the car seat;

FIG. 10 A illustrates a method for reclining the car seat;

FIG. 10 B illustrates mechanical means used for displacing and reclining the car seat;

FIG. 10 C depicts a zoomed and detailed view of the guided track and the movable connecting joint between the top housing and the base of the car seat as shown in FIG. 10 B;

FIG. 10 D illustrates mechanical means used for displacing and reclining the car seat;

FIG. 10 E depicts a zoomed and detailed view of the guided track and the movable connecting joint between the top housing and the base of the car seat as shown in FIG. 10 D;

FIG. 10 F illustrates mechanical means used for displacing and reclining the car seat;

FIG. 10 G depicts a zoomed and detailed view of the guided track and the movable connecting joint between the top housing and the base of the car seat as shown in FIG. 10 F;

FIG. 10 H illustrates a detailed view of an alternative mechanical means used for displacing and reclining the car seat;

FIG. 10 I illustrates a detailed view of an alternative mechanical means used for displacing and reclining the car seat;

FIG. 10 J illustrates a detailed view of an alternative mechanical means used for displacing and reclining the car seat in its initial position;

FIG. 10 K illustrates a detailed view of an alternative mechanical means of FIG. 10 J in its reclined position;

FIG. 11A illustrates a method for adjusting seat belt pressure on a child placed in the car seat;

FIG. 12A illustrates a side view of a car seat facing forward and placed on the back seat of an automobile;

FIG. 12B illustrates a car seat in a rotated position and placed on the back seat of an automobile;

DETAILED DESCRIPTION

Reference will now be made in detail to the present examples of the invention illustrated in the accompanying drawings. Wherever possible, the same reference numbers will be used throughout the drawings to refer to the same or like elements.

Figure 2:
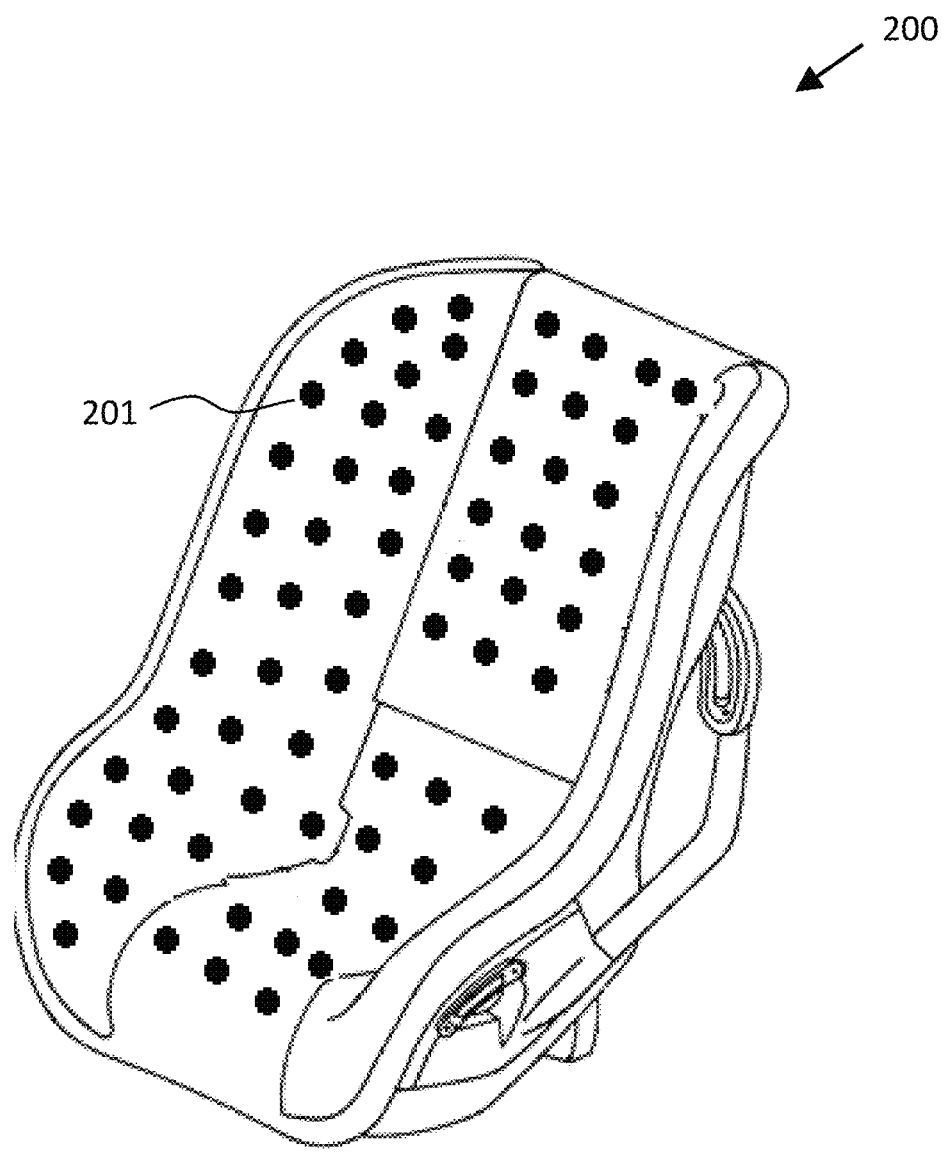
FIG. 2 illustrates a car seat having a plurality of sensors.

FIG. 2 illustrates a car seat having a plurality of sensors. The plurality of sensors 201 are placed at various location inside the car seat 200. They may be stitched inside the cloth that covers the car seat 200 or they may be attached to the main body of the car seat 200. The sensors 201 would have access and/or visibility to various sections of the car seat as well as be positioned to detect the presence of a child in the car seat and also take any measurements of the child's body as needed. The sensors 201 may also be used to detect other parameters of a child or detect the conditions of the car seat. The sensor may be pressure sensor, brainwave sensor, motion sensor, surface wetness detection sensor, actimetry sensor, vibration sensor, heartbeat sensor and other sensors that can monitor sleep behaviors. The group of sensors may also include a GPS sensor that provides location. Although the figure depicts several sensors equally spaced covering the entire region of the car seat, other configurations, random placements of sensors, lesser number of sensors that are spaced apart at random distances are also contemplated by the invention.

Vertical Movement of Shoulder Straps

Figure 3A:
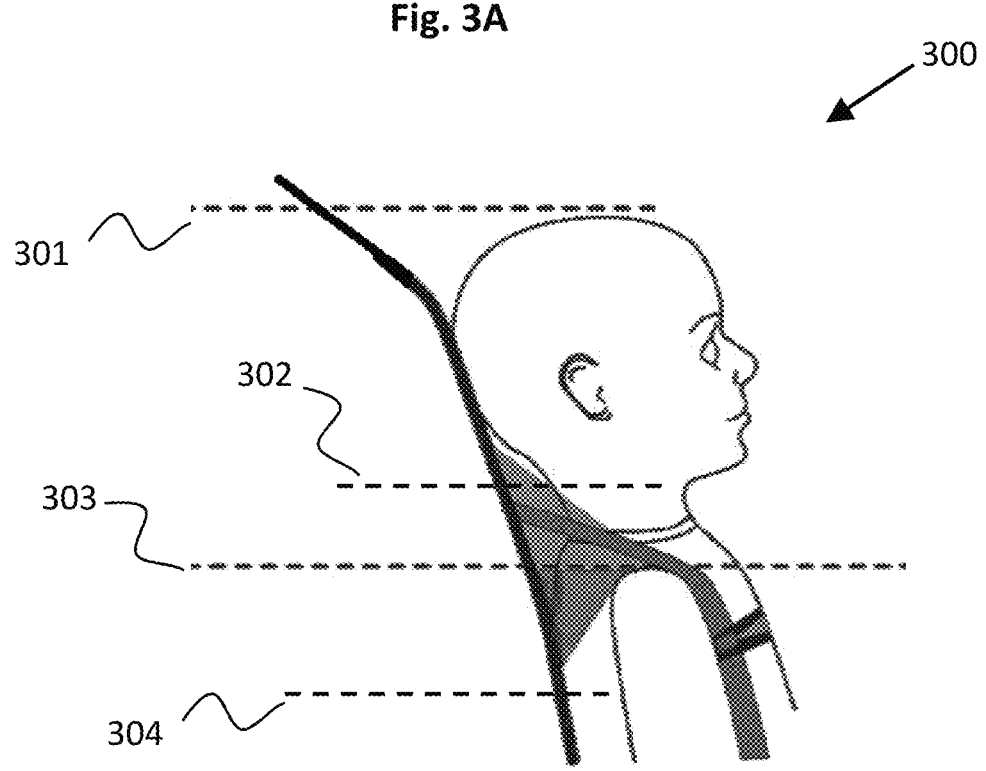
FIGS. 3A and 3B illustrates a child placed inside a car seat, where
Figure 3B:
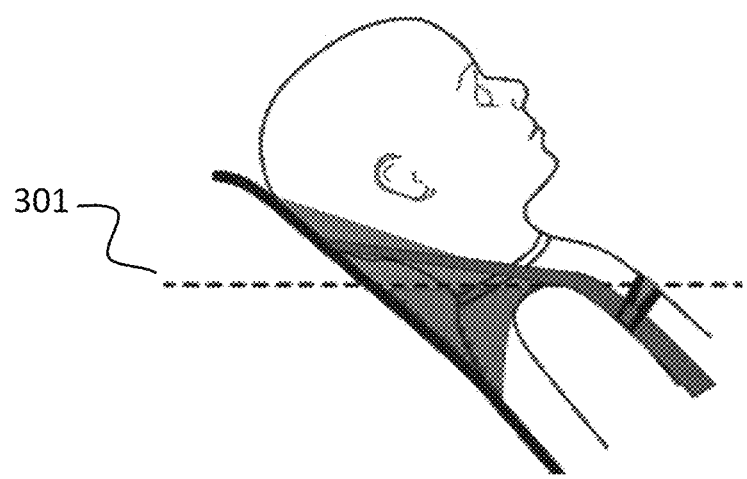

FIGS. 3A and 3B illustrates a child placed inside a car seat, where FIG. 3A shows the child in a sitting up position and FIG. 3B shows the child in an inclined position. The current invention includes a car seat system with a plurality of sensors, as in FIG. 2, for determining the specific measurements and features of a child that is placed inside the cars seat. At 300, some of these points of measurements are shown. These measurements include determining the vertical position of the top of the child's head 301, top of top the child's shoulder 302, top of the neck 303, vertical position of the armpit 304. These measurements are determined in both cases when the child is upright and when the child is reclined. The system also determines the exact vertical position of the shoulder with respect to the car seat. The sensor based car seat system calculates the exact vertical position of the child's shoulder and the top of the shoulder and informs the systems of its height with respect to the car seat, as if one were to draw an arbitrary horizontal line between top of the child's shoulder and the car seat and determine where the shoulder line meets the car seat.

The sensor based car system includes a mechanism that has engages with the shoulder straps and the harness of the car seat. The mechanism includes mechanical means that are placed in the rear part of the car seat. These mechanical means are capable of moving upward and downward to a desired or a recommended position. Unlike prior art, which instead has 2 or 3 pairs of apertures or preset locations as shown in FIG. 1, the mechanical means in the present invention are not restricted by any presets or any predefined distances and are able to move the shoulder belts vertically as little or as large as possible.

Figure 4:
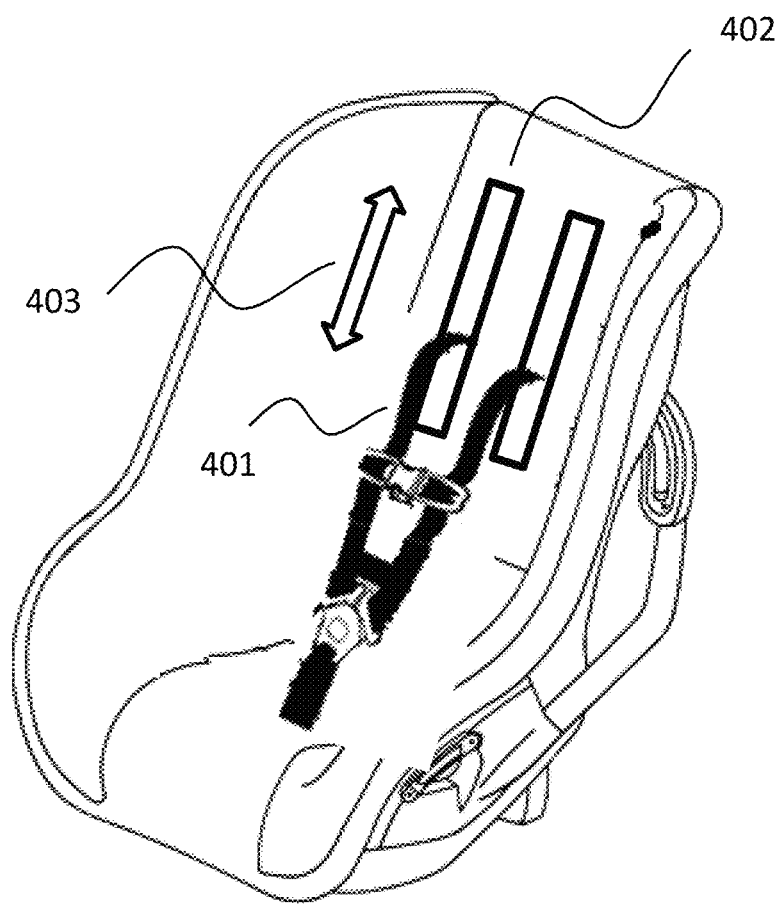
FIG. 4 illustrates a car seat having a sliding panel for allowing the vertical movement of the shoulder belts.

FIG. 4. illustrates a car seat having a sliding panel for allowing the vertical movement of the shoulder belts. In this embodiment, the mechanical means are coupled either directly or indirectly to the pair of shoulder belts 401. The shoulder belts may pass from the front side of the car seat to the back side of the car seat through a vertical opening 402 for moving upward or downward within the vertical opening as indicated by the arrow 403. Alternatively, the vertical opening may include an attachment means that may attach to the shoulder seat belts. The vertical opening may be visible or be covered.

The unlimited and unrestricted vertical movement allows the mechanical means to place the shoulder belts precisely at the height of the child's shoulder. Since children come in all sizes and grow in various increments, rather than use some standard 3 inch preset, the current invention accommodates each child to their exact shoulder length. Further, the sensor based system allows for height adjustment without having to remove the car seat from the car, without the need to detach the car seat with the car's attachments, and without the need to turn the car seat to its back side in order to access the rear of the car seat. The height adjustment is done automatically without any need of manual intervention. However, in another embodiment, if the caregiver decided to further adjust the height after the automated sensor based car system does the adjustment automatically, there are means provided to adjust it up or down without having to remove the car seat or flip it backwards.

The sensor based also allows easy switch from having a younger or smaller size child in the car to having an older or taller sized child though the automated adjustment mechanism.

FIG. 5 illustrates a method for adjusting the height of the car seat's shoulder belts using a height adjustment system 500. At 501, system 500 scans the car seat to determine the presence of a child using sensors. Once it is determined that a child is present in the car seat, system 500 takes a reading of various measurements of the child. These measurements may include, both vertical and horizontal placement of the child, height of the child's shoulder and top of the shoulders, vertical location of the armpit, positioning and exact location of the child's neck, start and end of the head, width of the child's shoulders, and neck and head.

Based on these readings, the system calculates the exact position of the child as well as various parts of the child's body with respect to the car seat. For example, the system may calculate based on an arbitrary horizontal line between the child's measurement and the car seat to determine exact point on the car seat where the body part would align horizontally. In cases where the car seat is at an angle with respect to the child's body, the system incorporates for the angles and calculates the horizontal pint at which the child's body would meet the car seat.

Once all the measurements and calculations are performed, at 502 the system 500 sends a command to the mechanical means to move either upward or downward such that the mechanical means pulls the shoulder belts to a height that precisely and horizontally aligns the child's shoulder to the car seat.

At 503, the mechanical means moves from its current position in the vertical direction of the arbitrary horizontal line in order to align the shoulder belts horizontally with the top of the child's shoulders and the car seat. Ideally the shoulder straps would be precisely horizontal to the child's shoulder creating an almost straight line as they are being passed through the front of the car seat to the rear where they are attached with the mechanical means. The system allows for some tolerance and small angles if the seat belts are not exactly in a horizontal line however tries to make the alignment as perfectly horizontal as possible.

At 504, once the mechanical means and the shoulder belts are moved and aligned with the child's body, the system 500 sends a command for the mechanical means to be locks such that no further vertical movement is allowed. This ensures that the child is safely restrained in the car seat and the shoulder belts are aligned. Further, once the mechanical means are locked, it does not allow for loosening of the belt so the child says secure.

At 505, the system determines the position of the mechanical means and the shoulder belt and analyses to confirm that they horizontally and accurately, within an allowed tolerance, are aligned with the top of the shoulder of the child.

At 506, if it is determined that the alignment is not within tolerance, the system 500 repeats the process from 501-505 to ensure proper alignment and height adjustment.

At 507, if the system 500 determines that the alignment is proper or within the tolerance, then it ends the process of height adjustment at 508.

Alternatively, at 509, the system 500 constantly, or at a predefined interval, check to ensure the shoulder belts continue to stay aligned during the course of the car ride. At times, children shift, they slide up and down, go to sleep, or have other movements that cause their shoulders to move up and down during the ride thereby changing their vertical position with respect to the car seat. System constantly checks periodically to ensure height alignment is adjusted anytime there is child movement that would make the shoulder belts become unaligned with the top of the shoulders of the child. It is also possible that instead of periodical checking, the sensors in the system 500 may send an alert to the system 500 when they detect motion of the child more than an allowed preset to check for height alignment and adjust if needed.

In the situation where the caregiver decides to switch the child in the car seat with another child, the system 500 runs through the process 501-508, and alternate lively 509, and automatically adjusts the height of the shoulder straps without any intervention of the caregiver making it very easy for a care giver to switch children as frequently as desired without having to undergo laborious methods of Horizontal Movement of Shoulder Straps In another embodiment, system 500 also determines the width of the child's shoulder, width of the child's head and width of the child's neck to determine both the horizontal and vertical positioning of the child in the car seat. Every child's body is shaped differently and as such one child's body measurements are unique from another child. Some children have wider shoulders than others and some have taller necks or wider or taller heads. System 500 calculates the width and height of several body parts to determine appropriate securing angles.

The shoulder belts should not only be adjusted vertically to align with the shoulders of the child but also horizontally so they gave a proper amount of width space that is recommended by safety analysts and safety regulations and/or guidelines. System 500 also calculates the width measurements of the child and undergoes a similar process as defined in steps 501-508, alternatively in 509, for the width adjustment of the shoulder straps. The difference for adjusting the horizontal spacing between the shoulder belts, instead of the vertical height adjustment as mentioned in FIG. 5, would be to have replace step 505 and instead determine the neck and shoulder width such that shoulder belts are displaced horizontally to accommodate.

Once the process is completed, the width or the distance horizontally between the two shoulder straps is both a comfortable distance from each other and also within recommended safety guidelines.

For a child with a wide neck, the system ensures that the two shoulder straps are not so close to each other, and tight, such that the neck of the child is irritated or causes breathing restraint. If a child with a wider body, wider neck, and shoulder is placed in the car seat, the sensor based automated car seat system would recognize the width measurements through the calculations performed, and automatically adjust the width of the straps.

Displacement of Middle-Section Clip of the Seat Belt

Safety guidelines suggest that the horizontal clip that locks the two shoulder belts together should be placed at armpit level of the child. In practice, caregivers note that the horizontal clip shifts higher than the armpit level, or more often lower than armpit level towards the child's stomach, which is not recommended by safety guidelines.

The current invention ensures that the middle safety clip—the horizontal clip that locks the two seat belts together—always remains at the armpit level regardless of the movement of the child, adjustment of the belts height during the duration of the ride.

In one embodiment, the seat belt system includes sensors in the shoulder belts. The sensors communicate with the sensors in the car seat to determine child's armpit level. The shoulder belts also include a mechanism that allows for upward and downward movement of the middle safety clip. For example, the mechanism may include rollers to push the middle safety clip vertically, the mechanism may also apply the conveyor belt type system in which each shoulder belt consists of a long-closed loop belt that is pulled upward or downward as the belt is rolled in a particular direction. Alternatively, other means of moving the middle safety clip upwards or downwards is also contemplated.

Since the middle safety clip has two parts, a male part and a female part, which upon insertion into each other locks the two shoulder belts together, and typically one part of the middle safety clip is attached to one side of the shoulder belt and the second part attached to the other side of the shoulder belt, the current invention ensures that both portions of the middle safety clip align properly so they may lock properly.

The system periodically checks for movement of the middle safety clip and adjusts its vertical position up or down to being it within armpit level at all times.

Figures 6A, 6B:
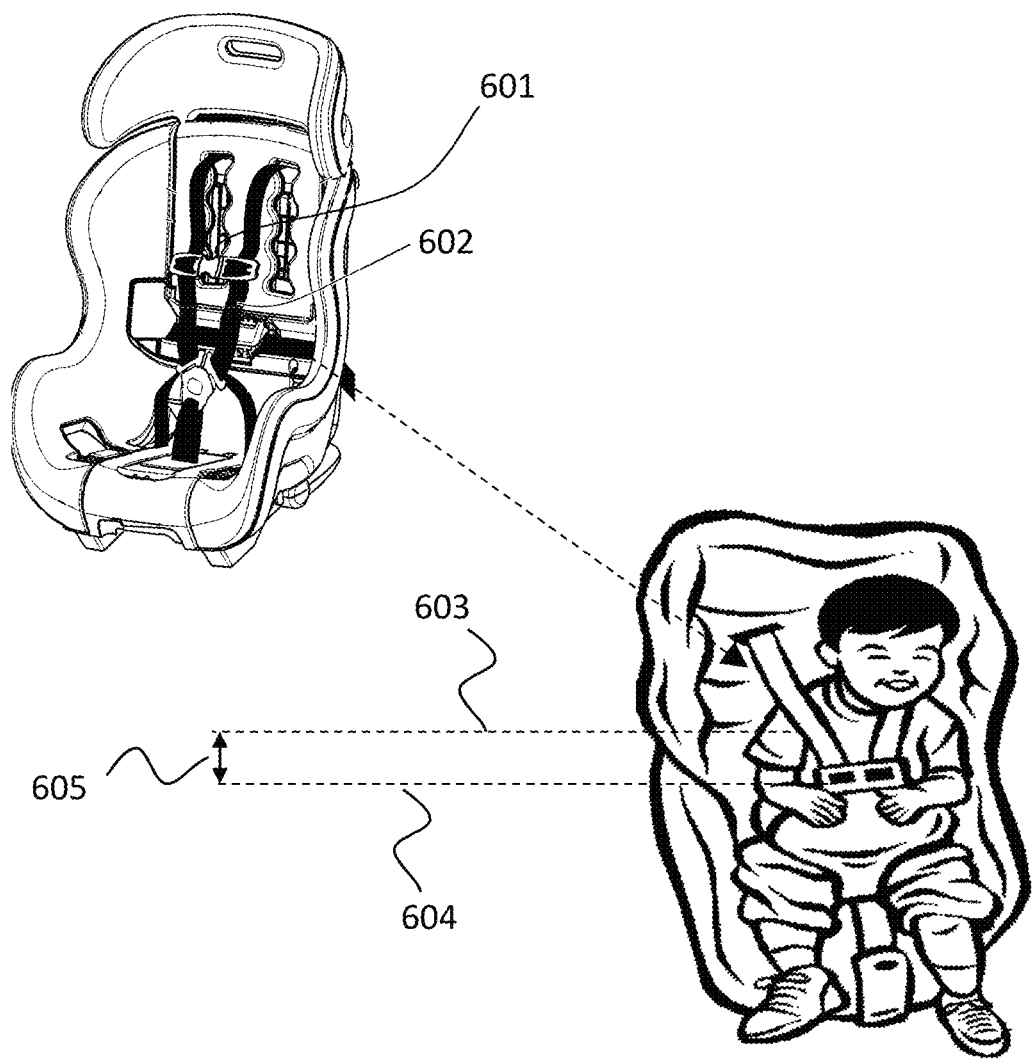
FIG. 6A illustrates a car seat having a pair of shoulder belts and middle-section clip used for connecting the pair of to each other.
FIG. 6B illustrates a child placed inside a car seat having a pair of shoulder belts and middle-section clip used for connecting the pair of to each other.

FIGS. 6A and 6B illustrate a car seat having a pair of shoulder belts and middle-section clip used for connecting the pair of to each other. In FIG. 6A, the middle safety clip 601 is connected to the pair of shoulder belts 602. In FIG. 6B a child is placed in the car seat. The sensors determine the armpit vertical level to be at 603 and detect that the middle safety clip is a vertical height of 604. The system calculates the delta 605, which is the vertical distance between 603 and 604. The system is alerted that the delta needs to be closed and commands the middle safety clip to move in the direction of 603, in this example, upwards, to adjust and be in line with the armpit level.

FIG. 7A illustrates a detailed view of the middle-section clip coupled with a pair of shoulder belts. FIGS. 7B and 7C illustrates methods of displacing the middle-section clip.

FIG. 7A depicts a top view of middle safety clip 701 connected to a pair of shoulder belts 702 and 703. FIG. 7B depicts a side zoomed in view of one of the shoulder belts 702 from the pair of the shoulder belts and the middle safety clip 701.

In FIG. 7B, the shoulder belt 702 comprises of a top and a bottom and a portion of one side of the middle safety clip 701 connected to one side of the shoulder belt. The connection may be a coupling, a stitching of the one side of the middle safety clip 701 to the shoulder belt or other means of securing the one side of the middle safety clip 701 to the one side of the belt that is outward facing from the child. In one exemplary operation, the shoulder belt 702 is pulled around a connection point (not shown in picture) such that the top of the belt may move to the left while the bottom of the belt moves to the right, similar to a conveyor belt system. This movement results in pulling the one side of the middle safety clip 701 to either upwards or downwards as desired. Since this is only one side of the pair of belts, belt 703 would be coupled with the other side of the middle safety clip 701 and likewise operate in the same manner such that both sides of the middle safety clip 701 are aligned at the end of the operation with each other.

FIG. 7C depicts one side of the shoulder belt along with one side of the middle safety clip 701. In this embodiment, a mechanism allows for the moving of one side of the middle safety clip 701 upwards or downwards as desired. In this embodiment, one side of the middle safety clip 701 is enclosed within one side of the shoulder belt 702 and connected to a pulling means, such as a rope, string, wire etc. The pulling means 706 would pull the one side of the middle safety clip 701 upwards or downwards as desired while the one side of the middle safety clip 701 rides along a path 704 and 705.

Other means of moving the middle safety clip 701 upward or downward based on a command sent from the systems are contemplated.

Displacement of Sides of the Car Seat

FIG. 8A illustrates an isometric view of the front of the car seat and FIG. 8B illustrates a block diagram of the front view of the car seat. FIGS. 8a and 8b are used to show a method for displacing the sides of the car seat. In yet another embodiment, car seat system as shown in FIG. 8 system measures the lower body of the child. These measurements include the waist size, belly size, hips, and chest area. In this embodiment, an assembly of mechanical and electrical components are included. If the child is of a wider stature, e.g., wider hip, belly, waist, then the car seat at the base (alternatively at higher locations if need more space in chest area) expands horizontally to accommodate for their measurements. Likewise, if the child is of a smaller stature, the car seat horizontally narrows so as to give a snugger feel to the child. Caregivers can choose to allow for an extra width, such as an extra inch or two or whatever they extra width they prefer, so that the expansion and contraction allows extra room to the child's preference to give a comfortable feel.

In one embodiment, as shown in FIG. 8A, the car seat at the bottom or base location 801, determines the width of child's body on that area. The movable section 802 is situated where the hands are placed and the hip and lower body of the child is placed. The movable section is capable of moving horizontally or expanding to provide additional room for the child's body to be comfortable.

As shown in the front view, section 802 is moved to expand on both sides of the car seat in order to provide extra room for the child's body in these areas. The amount of expansion may be desired and controlled manually or the system may automatically determine the amount of movement needed to accommodate the child's body placed in this area.

A mechanical means that includes a rod that may rotate to move this portion of the car seat outward or inward exists. The mechanical means is capable of receiving commands and running through a process similar to process shown in FIG. 5 for width adjustment of the base of the car seat.

Other side sections of the car seat, such as near the chest area may be horizontally movable based on child's measurements.

Automation of Car Seat

FIG. 9 illustrates a complete automation system 900 for the car seat according to one embodiment. The complete automation system 900 adjusts all the movable components of the car seat to provide a safe and comfortable experience for the child and be in accordance with safety guidelines. The complete automation system 900 includes various types of sensors, movable mechanisms, and a communication module capable of receiving commands and being communicatively connected, for example through Bluetooth, Wi-Fi, to an external mobile device, car's navigation and computer module, or car's ABS module. Alternatively, the complete automation system 900 may also be able to recognize and receive voice commands.

At 901, the complete automation system 900 senses various features of the child. These include shoulder height, shoulder width, neck height, neck width, vertical dimensions of the head and its width, width of the child's hips, thighs, waist, chest, and depth of the child's body in various areas that are seated on the car seat. Based on the data collected, the complete automation system 900 is capable of calculating and creating a complete 3D model of the child seated in the car seat.

In one embodiment, the caregiver may choose to lock in a base setting of the child by placing a child with thin or body tight clothing or clothing that is less than 45 millimeters in thickness such that the complete automation system 900 gets a baseline measurement of the child. Alternatively, complete automation system 900 will determine the baseline measurement of the child each time the child is placed in the car seat. Since each time the child may be wearing different clothing, the complete automation system 900 overtime refines the data to develop an accurate 3D model of the child. The complete automation system 900 may also periodically reevaluate and construct new 3D model to determine child growth. The baseline models will help the system evaluate the thickness of clothing every time the child is seated in the car.

Alternatively, instead of creating a 3D model, the system may recognize several critical measurements of the child that will affect the positioning of the car seat components.

At 902, once the measurements are compiled, alternatively a 3D model generated, the measurements are stored and communicated to the complete automation system 900 and other modules that are associated with the complete automation system 900.

At 903, complete automation system 900 determines the current location of various components of the car seat. These components include, height of the shoulder straps, horizontal positioning of the shoulder straps, horizontal distance between each shoulder strap, positioning of the middle safety clip, height of the head rest, current position of the movable members near the child's hip and waist, and other components as needed. The complete automation system 900 would then calculate the current position of these components in relation to the child's measurements to determine movement of each component required to comply with safety and comfort settings.

At 904, once the calculation of the current position of the car seat components and the desired position are completed, the complete automation system 900 sends a command to the associated mechanisms to move each component either vertically or horizontally to bring them to the desired location. In response to the commands, the associated mechanisms would move the components to their desired locations, e.g. shoulder straps height should be aligned with the child's shoulders, the middle clip should be at child's armpit length and the car seat members near the hip and waist should be at a comfortable distance from the child's body and in compliance with safety guidelines such that they are neither too far away from the body not too tight. Other movable components have been discussed in this application.

At 905, once all the components have been moved and situated, the complete automation system 900 evaluated whether the child in the car seat is a new child that is being placed in the car seat for the first time or whether it's a child that has sat in the car seat before.

It performs this determination by various means. In one instance, the caregiver can select the profile of the child through their APP. In another instance, the caregiver may simply send a voice command indicating that a specific child, e.g. Brian is seated in the car seat or alternatively mention new child and the child's name. The complete automation system 900 may also perform automatic recognition of the child based on the child's measurements and other features, such as child's weight, voice, or timing of use.

Since the complete automation system 900 builds profiles for each child and stored them, it would recognize whether it is a new child or a child that has sat in the car seat previously.

Once the complete automation system 900 system determines that it is a child that sat in the car seat previously, at 906, complete automation system 900 loads the previous settings that are suggested for the child. This may include certain lumbar support, certain width of the movable members near the hip, certain shoulder straps horizontal distance, certain armrest height while staying within the safety guidelines.

If the child is not recognized, at 907, the complete automation system 900 would simply adjust the movable components of the car seat based on the current measurements of the child.

Alternatively, at 908, the complete automation system 900 would periodically evaluate the settings during the course of the car ride and make any appropriate adjustments as needed. These adjustments include both comfort settings as well as safety compliance settings. For example, if during the course of the ride the middle clips is not at armpit level, the complete automation system 900 would adjust it to bring it to armpit level.

At 909, all the movable components are locked in place such that the child is securely fastened and both comfortable and secure during the ride.

Although some methods of determining the child's chest area thickness and thickness of clothing are described, the invention is not so limited. For example, the system may work by displacing the seat belts at a slow pace until they press against the clothing of the child in the chest area until a certain amount of pressure is applied. This method would allow any thickness of clothing, such as a sweater, coat, jacket, ski suit, sports gear or other thicker material clothing or wearable on the body, to be worn by the child and accommodate for its thickness. The goal would be to tighten the seat belt while striking a balance of applying enough pressure to stay within the child car seat safety and desired standards and at the same time not applying too much pressure to cause discomfort or suffocation. As such, the amount of displacement of the belts will be more when applied to a child that is wearing no clothing, body tight clothing, or clothing that is under 45 mm and a lesser displacement of belts is applied when the child is wearing a thicker snow jacket. In both cases the pressure applied would be within the car seat safety or desired guidelines such that in the event of braking or sudden stop, the forward movement of the child in the chest area is minimized.

Car Seat in Sleep Mode

In one embodiment, a child may start of in an upright position and then fall asleep sometime during the course of the ride. Normally, most children are used to sleeping in a reclined position at home, either in their beds or their cribs, and sleeping upright is not as comfortable. The child may also be already sleeping when inserted into the car seat.

FIG. 10A illustrates a method for reclining the car seat. System 1000 reclines the car seat to a more comfortable position. In one embodiment, the system 1000 is capable of receiving commands through a Bluetooth or Wifi connected device. Alternatively, the system may also be hardwired. The device may be a mobile phone, car's navigation module, or some other mobile device. The device may be paired to the car seat system 1000 and may require authentication and maybe password protected.

In another embodiment, the system 1000, at 1001 may automatically detect a particular condition of a child, such as the child has gone to sleep. A combination of various measurements may be taken to determine a sleeping condition. For example, a sleep condition can be determined by monitoring heart pulses to determine if they go below a certain threshold, brainwave sensors, a motion sensor, breathing patters, actimetry sensors, and other sleep behavior techniques.

In another embodiment, the system 1000, at 1002, may receive a command from a device alerting the system 1000 that the child has gone to sleep. The device may be a mobile device, a car's navigation system or display panel, a hard wired device, a camera or a Artificial Intelligence or Machine learning device connected to the system 1000. The system may also have a voice recognition module that would allow the caregiver to utter a certain phrase, such as Go to Sleep Mode, or any other phrase they program into the system. Hearing the recognized voice and the recognized phrase, the system would send a command to the go into sleep recline position. For example, while driving the car, the caregiver may utter the words for the system to go to sleep mode. Alternatively, the car seat may also include a push button that can be pushed, for example, by another passenger of the car to enter it into sleep mode.

In yet another embodiment, a video camera may be monitoring the child placed in the car seat. The video camera may be equipped with or connected to an Artificial Intelligence (AI) system that would review the child's behavior, such as, shutting of the eyelids (partially of completely), yawning, or moving head and other parts of the body that the child that correlates with the child's pre-sleep pattern. The AI system may also learn over time and record and determine the child's pre-sleep behaviors at a higher percentage rate as it learn the child's habits and records them over time.

Once a determination has been made that the child is about to or has gone to sleep, the system may go into sleep mode.

In yet another embodiment, a camera facing the child having a motion sensor may be used. The camera may be connected to the system 1000 thorough various means, such as Bluetooth, Wifi, or hardwired. The motion sensor in the camera may detect non-movement and alert the system that the child has gone to sleep. Alternatively, instead of a motion sensor, the camera may be use software that takes frequent images of the child and compares the images to determine if there is lack of motion or motion that correlates with sleep and alert the system that the child has gone to sleep.

In yet another embodiment, a timer may also be used to send the system into sleep mode. For example, the timer may be programmed through various means (such as mobile application or a display on or connected to the system) for the system to go to sleep mode at a certain time, after a certain amount of drive time, or at a particular time of day that is routine for the child to sleep.

At 1003, the system sends a command for the car seat to recline into a sleep position. These may be the result of operation 1001 or 1003 or alternatively the voice and phrase recognition mentioned above. Some of the systems described in step 1002 may be used to determine if the child has gone to sleep before entering into sleep mode. Alternatively, a parent of caregiver may enter the voice commands or other means to send the system into sleep mode regardless of whether or not the child has gone to sleep.

At 1004, the mechanical means within the car seat would start reclining the car seat into a sleep reclined position. Some of these mechanical means are discussed in further detail in FIGS. 10B-10K. Since each child may have a different sleep reclined position, the caregiver may be able to adjust the sleep reclined position through their APP or mobile device. The caregiver may also provide preset setting that they know is more comfortable for their child for their comfortable sleep.

At 1005, alternatively, the system would automatically try certain sleep setting of its own. At 1005, if the child continues to be moving, fidgety, crying, or signaling that they may be uncomfortable, the system tries another setting and then another setting until it determines the setting to be a comfortable sleep setting for the child.

In one embodiment, AI and machine learning techniques may be applied to learn the child's patterns and behaviors to determine pre-sleep, comfort levels during sleep, and typical adjustments of the car seat and its feature during sleep mode to continue to provide comfort. The system may also learn what conditions and adjustment of the car seat features allows a longer sleep mode and which correspond with gradually waking the child towards the end of a car ride. The system may also make adjustments at stop lights, traffic jams, and noisy areas during the car ride to sooth and provide comfort to the child.

The system may also perform partial reclines and various other positional movements all while staying within the safety guidelines of a car seat.

The system may also include additional components, such as a sound speaker, a vibrating device, a fan, and/or a heating or cooling element. Through use of these and other component, the system may provide additional features and comforts such as soothing music, vibration, temperature setting to allow for a better sleep environment for the child.

The temperature setting may also be controlled by the caregiver and the system may be programmed to alert certain temperature settings, such a setting an alert when the car seat temperature is over 90 degrees Fahrenheit such to sound an audible alert such that the caregiver may choose to wait and until measures are takes to cool the car seat before placing the child in the car seat.

Over a period of time (e.g., hours, days, weeks), the system may learn various sleep behaviors of the child and accordingly adjust to provide a better and more comfortable sleep setting. This would include, certain reclined positions, alternative reclined positions after the child is in deep sleep, alternative recline setting when it detects movement, or a timed setting that would change after a certain period of sleep time.

In another embodiment, where the child is not yet asleep, and the caregiver recognizes that the child is tired, or that it's the child bedtime, or that it is time for child to take a nap, the caregiver may send a command to the system to go into a sleep mode or a gradual sleep mode. In its sleep mode, the car seat may recline to the position where it feels is the best and most comfortable position for the child to sleep. The system may also load previous data to determine what sleep setting worked best for the child in the past to have a comfortable sleep. The caregiver may also suggest a particular reclining position for the child.

Alternatively, the caregiver may command the system to go into a gradual sleep mode. If the child is not yet sleeping, and the caregiver desires the recline to be gradual and take a certain period of time, such as one hour, to get to its full recline position, the caregiver may select a gradual sleep setting and select parameters such as time, amount of recline, and any other features to be displayed over the selected amount of time thereby gradually getting the car seat in a position that would facilitate sleeping of the child.

FIG. 10B illustrates mechanical means used for displacing and reclining the car seat. The figure depicts a car seat having a base 1010 and movable top housing 1011. The base 1010 is connected to the movable top housing 1011 such that the movable top housing 1011 is structurally supported and also allowed to move.

The base includes a means for allowing the movable top housing 1011 to be structurally coupled to it. This may be through a guided track and rail or a roller or mechanism that is allowed to slide within the provided guided tracks, of some other type of guided interaction ensures that the movable top housing 1011 can be locked into a desired position as well as allowed to move when desired. When in the locked position, the movable top housing 1011 would be locked in vertical and horizontal direction such that is it not allowed to displace while being locked.

The base 1010 allows the movable top housing 1011 to move in a particular direction when desired. The movement is guided such that it can displace the amount of displacement required. The displacement also allows the tilt or recline of the movable top housing 1011 at a desired angle. The movement and recline angles can be locked and unlocked as desired by the user or automated. In case of a sudden stop or braking of the car, the displacement is locked at its position at the time of stop or brake.

As shown in FIG. 10B, the car seat is currently in its upright and initial position. In this position the movable top housing 1011 is backed into the automobile's seat such that the back 1012 of the movable top housing 1011 is aligned or touching the automobile's backseat rest 1013 to the fullest extent possible, i.e., such that there is minimal gap between the two.

A guided track 1014 is part of the base 1010 of the car seat. The figure shows a cross section of the car seat that depicts the guided track 1014. The guided track 1014 may be covered by material, an external piece, or the outer portion of the car seat such that it is not visible from the outside.

In its upright and initial position, the car seat's movable top housing 1011 may be locked with respect to the base 1010 such that there is no movement in-between the movable top housing 1011 and the base. The structural piece 1015, also referred to as the movable connecting joint between the two structures (housing and the base), that is attached to the movable top housing 1011 is locked within the guided track 1014. The structural piece is part of the movable top housing 1011 and placed within the guided track 1014. The structural piece 1015, when locked provides structural and positional stability such that the movable top housing 1011 cannot be detached and from the base and at the same time is supported such that there is no wobbling or undesired movement of the movable top housing 1011. Although one structural piece is shows, multiple structural pieces are also contemplated.

FIG. 10C depicts a zoomed and detailed view of the guided track and the movable connecting joint between the top housing and the base of the car seat. The movable connecting joint/structural piece 1015 slides along the guided track horizontally as well as at an angle direction that is located at one end of the horizontal path of the guided track. The arrows show the back-and-forth movement of the connecting joint 1015 along and inside the guided tracks. The mechanism in 10B and 10C is used for displacing and reclining the car seat shown in FIG. 10B.

FIG. 10D illustrates mechanical means used for displacing and reclining the car seat. The car seat and its mechanisms shown in 10D is the same car seat and mechanism in 10B, however, 10D shows that the structural piece 1015 was advanced to the left to move the car seat's top housing 1011 forward thereby creating a space between the back of the car seat housing 1011 and the automobile's backrest 1013.

FIG. 10E illustrates detailed view of the mechanical means depicted in FIG. 10B that is used for displacing and reclining the car seat. In FIG. 10E, it can be seen that the structural piece 1015 has advanced to the left and along the guided lines.

Referring back to FIG. 10D, once the structural piece has been displaced as shown, the space between the back of the car seat movable top housing 1011 and automobile backrest 1015 is created. The space allows the car seat movable back housing 1011 to recline. The amount of space is determined by the system based on the desired angle of recline. For example, a higher angle of recline would require a larger amount of displacement to create enough space between the back housing of the car seat 1011 and the automobile's backrest 1013 while a smaller angle of recline would require less space and a lesser amount of displacement of the car seat's movable top housing 1011.

FIG. 10F illustrates mechanical means used for displacing and reclining the car seat and FIG. 10G illustrates detailed view of the mechanical means depicted in FIG. 10B that is used for displacing and reclining the car seat. As it can be seen in these two figures, the structural piece has been displaced along an angled section of the guided track 1014. Since the structural piece is connected to the car seat movable top housing 1011, any change in orientation and angle is reflected in the car seat movable top housing 1011 as well. As such, the shown displacement allows the car seat movable top housing 1011 to recline to a desired angle. The angle of decline can be controlled by the amount of displacement along the angled guided track.

FIG. 10H illustrates a detailed view of an alternative mechanical means used for displacing and reclining the car seat. In this embodiment, the guided track 1017 may be along a straight line. The guided track 1017 would include a movable and rotatable joint 1018 that connects the car seat movable top housing 1011 with the base of the car seat 1010. The movable and rotatable joint 1018 is displaced horizontally to create a space between the movable top housing 1011 and the automobile's backrest 1013. The movable and rotatable joint 1018 can also be rotated thereby resulting in a reclining of the car seat movable top housing 1011. Displacement of the space and the angle of rotation can be controlled by the system based on the desired angle of recline.

FIG. 10I illustrates a detailed view of an alternative mechanical means used for displacing and reclining the car seat. In this embodiment, the guided track 1019 includes a plurality of locking positions 1020. The movable and rotatable joint 1018 can also be displaced from one locking cavity to another and also rotated while inside the locking cavity thereby resulting in a reclining of the car seat movable top housing 1011.

FIG. 10J illustrates a detailed view of an alternative mechanical means used for displacing and reclining the car seat in its initial position. In this embodiment, the guided track 1021 uses two structural pieces 1022 and 1023 to control the movement and rotation of the car seat movable top housing 1011. The structural piece 1022 is allowed to move horizontally while the structural piece 1023 is allowed to move horizontally as well as an angle along the angled section of the guided track. In its initial position, the car seat is in an upright position.

FIG. 10K illustrates a detailed view of an alternative mechanical means of FIG. 10J in its reclined position. As it can be seen in this figure, the structural pieces have been displaced to have the structural piece 1022 move to the left to create a space between the car seat movable top housing 1011 and the automobile backrest 1013. Structural piece 1023 also moves to the left while structural piece 1022 is moving to the left. Once space is created, then the structural pieces move back in a manner such that structural piece 1023 is guided along the angled path of the guided track 1021 thereby creating a reclining of the car seat.

Seat Belt Displacement to Accommodate Child Clothing Thickness (a)

A proper adjustment of seat belt requires adjustment of shoulder straps height, adjustment of width distance between the two belts horizontally based on child's shoulder width and neck width, and a depth adjustment to tighten or loosen the seat belt so that it applies appropriate amount of pressure on a child.

FIG. 11A illustrates a method for adjusting seat belt pressure on a child placed in the car seat. System 1100 determines the amount of seat belt pressure needed to be applied to the child. System 1100 includes sensors that determine location of the child's body and its measurements and pressure sensors that determine pressure applied to the child's body through the seat belt. Alternatively, system 1100 also includes strain gauges, tension gauges, pretensioners, cam shafts, restraint sensors and other means to determine pressure applied and the amount of pull by the belts.

At 1101, the system is alerted that a child is seated in the car seat. The system 1100 loosens the belts such that the child can easily put their arms inside the shoulder straps and buckle the shoulder straps to the front locking mechanism. At this stage, the belts are fairly loose allowing a child to be easily belted without struggling with a tight fit.

Once belted and locked, the system at 1101 starts to adjust the shoulder belts as well as the belts in the area of the thighs such that the belts are pulled back and then touching the clothing of the child.

At 1102, the system adjusts and tightens the seat belts such that they apply a proper amount of pressure on the child so not to tighten the belts too tight or keep them too loose while conforming to suggested guidelines (or user desire) for applied pressure. If the system determines that the clothing is thicker, then it would adjust such that it doesn't apply the same pressure when a child is not wearing a thicker clothing thereby preventive extensive tightness of the belts.

At 1103, the system locks in the belts such that they cannot be loosened or tightened. This step is performed after the system has determined that appropriate amount of pressure applied by the belts, meeting of safety standards, and ensuring properly securing of the child. The system lock prevents the belts from coming loose during the ride and also the child from leaning too far forward.

At 1104, if child moves, or takes off a piece of clothing, or adds another piece of clothing, the system re-evaluates the setting and adjusts the belts such that an appropriate amount of pressure is applied.

The automated evaluation of the seat belt positioning and pressure applied allows a caregiver to place the child in the car seat with various thicknesses of clothing, including frequently adding or removing layers of clothing, without having to manually adjust several car seat belt's settings for an appropriate level of engagement and pressure. Children are dressed differently every day and at times several times a day based on weather conditions and their own preferences, the system allows automated adjustment of seat belts regardless of the type of clothing thickness to safety guidelines and removes the pain involved with trying to properly constrain a child during winter months that has layers of clothing.

An addition advantage of the system is that it allows a caregiver to frequently interchange different children in the same car seat without having to adjust the seat belts based on their clothing or body size.

Car Seat Displacement to Accommodate Child Clothing Thickness (b)

When clothing is added to a child, the chest and stomach area of the child are effected and the mechanism above provides for a method of adjusting the belts and applying proper pressure. However, when layers of clothing are worn, other parts of the body also get effected due to the extra thickness. For example, the hip, thighs, width at the bottom of the body would also get thicker. As such, sitting in the same car seat with the additional layers may cause tightness in the width area as well and constraint. In one embodiment, as mentioned above, the car seat has a movable member 802 at the bottom, as shown in FIGS. 8A and 8B. This horizontally movable member includes mechanical means that includes a rod that may rotate to move this portion of the car seat outward or inward. Other mechanisms to move the seat inward and outward are contemplated.

The sensors determine the amount of clothing at the base of the car seat, in the thigh, stomach, and hip areas, and automatically move the horizontally movable member to accommodate for the appropriate thickness so as to give a comfortable feel even with thicker clothing.

Although a change of clothing causes the most significant changes in thickness around the child's body that come into contact with the seat belt and the base of the car seat, as discussed above, there may also be other reasons that require adjustment of the car seat belts and the base. These include eating of food or natural growth. Similar to how a belt works for an adult, that is needs an additional loosening on certain days and times, especially when a big meal is consumed, a similar reasoning also applies to a child after a meal. Since the system is capable of taking measurement reading, it detects any changes in the body of the child and adjusts the belts tension as well as the base accordingly.

Figure 11B:
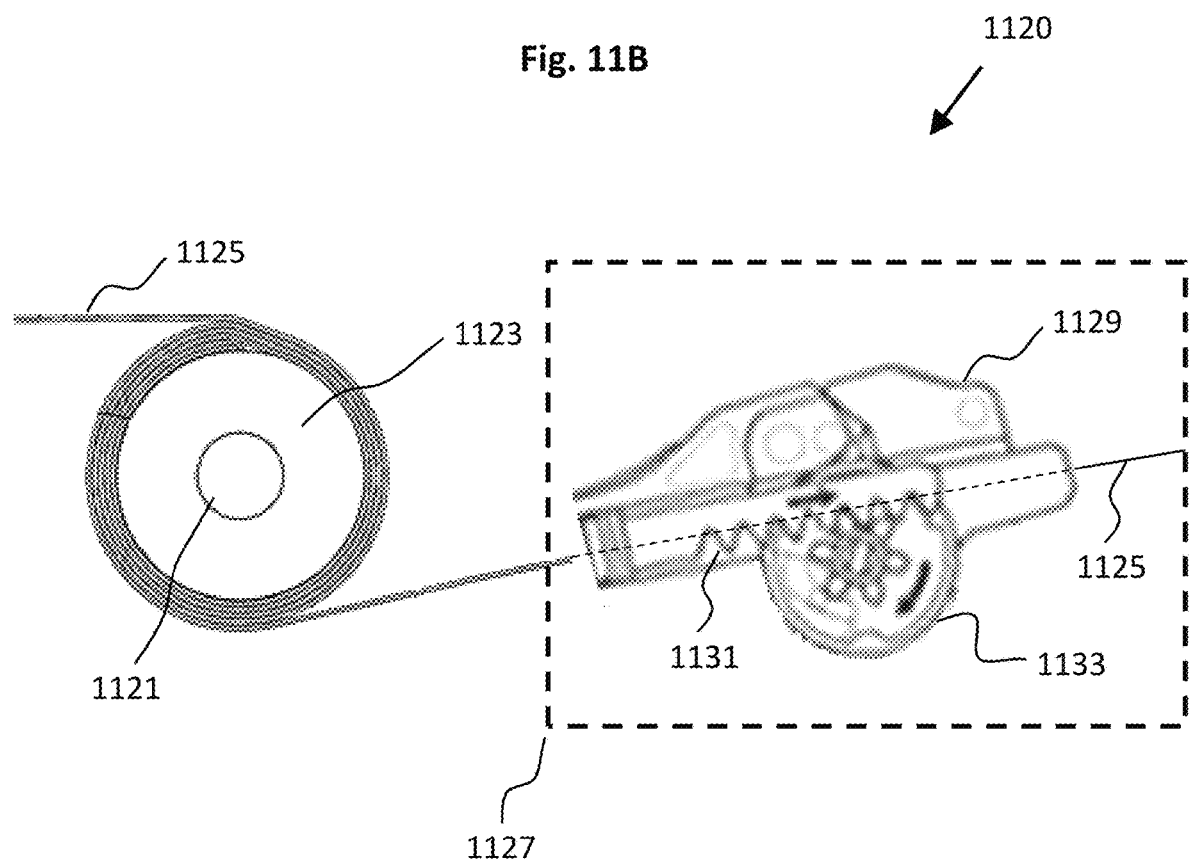
FIG. 11B illustrates a mechanism for releasing and retracting a seat belt in a child's car seat.

FIG. 11B illustrates a mechanism for releasing and retracting a seat belt in a child's car seat. The mechanism 1120 includes a motor 1121, a drum 1123, a seat belt 1125, and a pretensioner assembly 1127. The pretensioner assembly 1127 may include a supporting structure 1129, one direction belt grabbing teeth 1131, and a pretention assembly drum 1133.

The pretensioner can be mechanical, electrical, or pyrotechnic. The mechanism 1120 is used for a car seat, such as the child's car seat shown in FIGS. 2, 4, 6A, 6B, 8A, 8B, 10B, 10D, 10F, 12A, and 12B.

In operation, the seat belt can be passed through an aperture that allows the seat belt to pass form the front face of the car seat to the back side of the car seat. The seat belt can be engaged by both the motor 1121 and drum 1123 assembly as well as the pretensioner assembly 1127.

In one embodiment of the operation, once a child is seated into the car seat, the seat belt is loosened by spooling out a certain length of seat belt. Alternatively, the seat belt can also unlocked by the turning of the motor in a particular direction. When in its release mode, the motor would rotate the drum allowing the seat belt to loosen and be pulled by the child or the caregiver that is placing the child in the car seat allowing them ample room to pull out the seat belt, while wearing a think or thick piece of cloth and then locking the seat belt by buckling it into a receiving lock. While the belt is being pulled forward, the pretensioner assembly allows the flow of the belt in the forward direction but displacing the one supporting structure 1129, one direction belt grabbing teeth 1131, and a pretention assembly drum 1133.

One the belts are locked into place, the system is alerted to be in lockdown mode. The alert can be communicated through sensors or other electronic means. Alternatively, a communication is not needed and only a forward pull of the belts is allowed.

Once locked down, the motor 1121 would rotate the opposite direction thereby allowing the drum 1123 to pull back and store the belt around itself. The pullback would continue until all the loose belt is pulled back or until the motor senses a certain amount of strain is met. The motor can be programmed to pull until a certain amount of pressure is detected and then stop and lock, or it can be programmed to pull back until a certain amount of pressure is detected and then loosen just a small percentage to allow some additional comfort.

In the lock down mode, while the motor 1121 is retracting the belt, the pretensioner assembly 1127 allows the movement of the seat belt therethrough its drum 1133, one direction belt grabbing teeth 1131, and a pretention assembly drum 1133. However, since the one direction belt grabbing teeth 1131 only allow the belt to be pulled back, once in the retraction mode and forward pull makes the supporting structure 1129 come down on resulting in the, one direction belt grabbing teeth 1131 to lock the belt and prevent it from moving forward (analogues to a driveway tire spike that allow the forward movement of a tire but prevent the backward movement).

In yet another embodiment, a motor that spools out car seat belt and a one direction pretensioner can also be used. The motor would act to provide a loose belt and then retract it while the one directional pretensioner would prevent the belt form moving once locked and in tighten in the event of a tight pull, hard brake, or a rapid forward movement of the child's body.

Figure 11C:
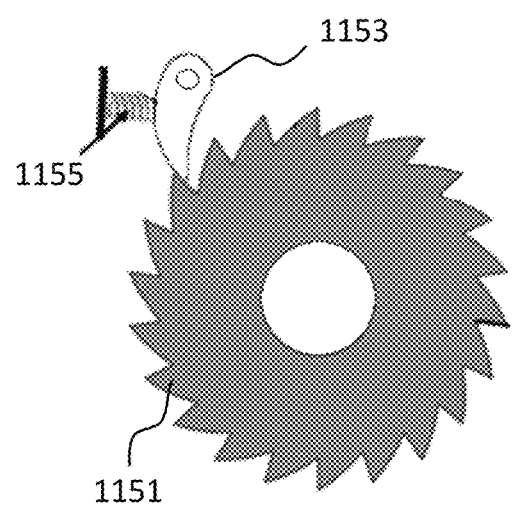
FIG. 11C illustrates a ratchet wheel and pivotal arm mechanism for releasing and locking a seat belt in a child's car seat.

Other alternative mechanisms to loosen, release, pull back, and tighten belt are also contemplated. For example, yet another mechanism is show in FIG. 11C which illustrates a ratchet wheel and pivotal arm mechanism for releasing and locking a seat belt in a child's car seat. In this mechanism, the ratchet wheel 1151 is rotated in the direction to either retract the seat belt or to allow forward movement of the belt. In lockdown mode, the ratchet wheel 1151 rotates clockwise and the pivotal arm 1153 that is spring loaded by spring 1155 allows the rotation of the belt along with the ratchet wheel 1151 thereby retracting and pulling the belt back to tighten it. For each tooth of the ratchet wheel 1151 rotated forward, the pivotal arm 1153 locks onto a previous tooth such that forward movement of the belt is prevented. Although on locking mechanism is shown, multiple locking mechanisms can be used with each locking mechanism for a specific purpose, such as a retraction locking mechanism and a loosening locking mechanism.

Comfort Preference Settings

In one embodiment, the system is capable of learning child's preferences and comfort setting. The system is also capable of calculating body measurements such as width and depth of the body, such as in the chest, thigh, and stomach areas. Since the system has the data on the child's body measurements, it is able to calculate the thickness of the clothing placed on the child with the sensors and pressure gauges. This mechanism provides a smarter and intelligent way to accurately determine the thickness of the clothing, including whether its fluffy, and apply appropriate pressure with the belts.

Likewise, the system is also capable of adjusting all the moving components of the car seat as mentioned above, e.g., shoulder belt height, width between pair of belts, car seat sides, to a desired comfort level for the child. The system retains data on conditions encountered and changes in the position to the car seat to accommodate those conditions and uses this data as a learning tool to forecast and plan future rides for additional comfort.

Car Seat Rotation

FIG. 12A illustrates a side view of a car seat facing forward and placed on the back seat of an automobile. Car seat 1201 is facing forward towards the front of the automobile and placed and locked on the back seat 1202 of the automobile. The present inventions include a car seat base that is capable of rotating the car seat from its front facing forward position.

FIG. 12B illustrates the car seat 1201 in a rotated position and placed on the back seat of an automobile 1202. The base of the car seat includes a base 1203 having rotating means that is capable of rotating the car seat in either clockwise or anti-clockwise direction.

For example, a car seat 1201 is placed behind the driver seat in a U.S. configured automobile. The car seat 1201 has a base 1203 that has capable of rotating. As shown in FIG. 12B, the rotating means can rotate the forward-facing car seat anticlockwise to 90 degrees or more towards the adjacent car door. The rotation allows a caregiver to easily access the car seat for placing a child in the car seat. Rather than trying to place a child in a car seat while its facing forward, the caregiver may choose to have the car seat rotated towards the door making it easy to place the child in the car seat and then rotate the car seat back so its forward facing and locked.

Likewise, at the end of the car ride, either upon a command from the caregiver, caregiver's device, upon opening of the door adjacent to the car seat, the car sat may rotate again towards the door and allow for easy removal of the child from the car to the outside.

The process may also be automated where car seat rotates towards the door once a determination is made that the car engine is off and the adjacent door is being opened. The caregiver may have the option to override the automated rotation as they choose.

In operation, the car sat would have mechanical means that would allow it to rotate. The mechanical means may include a rotation gear, a motor, and a module capable of receiving commands for rotation. The car seat may also include a rechargeable battery pack that powers the mechanical means and other features of the car seat. For example, the battery pack may be removed and recharged or have the option of getting a hard wired recharge or a wireless recharge to the battery. Other means of power, such as solar, wind, hardwired through a cigarette lighter or other power cords, wireless power may also be used.

Alternatively, the rotation may be a performed by a manual maneuver where the caregiver physically rotates the car seat, without having to detach it from the car locking mechanism or removing it from the car, by allowing it to unlock from it front facing locked position and then lock or latch back into a door facing position. The rotation means may also be a combination of a rotating disk or gear and a lack to lock it in place after rotation.

Artificial Intelligence and Learning

Systems used in FIGS. 2-12 mentioned in this patent application are capable of learning the preferences of a child over the course of time and automatically adjust the setting when needed. Each time a ride is taken by a child in the car seat, the system stores specific data from the ride. The data is then analyzed to determine preferences, change of car seat settings and the relationship of the changes to the surrounding factors such as child positioning in car, day/time of week, duration of the ride, temperature in the car, and various other factors that allow the system to recognize the potential type of movement needs in the future to accommodate certain factors. The data is continuously refined and used for building probabilistic and predictive models that provide for a more comfortable and safe ride for the child.

In the event a routine is established, such as a car ride from home to work on a regular basis, or a ride to grandparents every Sunday afternoon, the system obtains data of rough road conditions, potholes, sharp curves on the road, uphill/downhill terrains and accommodates those conditions by adjusting movable parts of the seat belt system for a smoother and safe ride. The data may be obtained through car's navigation system maps, user input through mobile application on routing, and crowd sourcing communication methods between automobiles, such as Waze.

The system may also learn schedules and child patterns, such as, on Wednesdays, the child goes to sleep on the long drive after being in the car for 25 minutes. Based on its learning over a course of time, system may adjust before the child goes to sleep to get them to sleep gradually. The system may also learn of schedules like, every Sunday child goes to soccer or swimming at a certain time and once the child returns to the car seat, a certain setting is preferred.

In another setting, the caregiver may also have a preferred reclined position for the child, and have the system, go to that reclined setting gradually over a desired period of time—such as one hour—such that the slow and gradual recline may get the child to their sleep state over the desired time.

The system may also learn attire worn by the child on certain days, or the system may obtain weather data to predict the type of clothing the child may be wearing and then adjust the seat belt movable parts as needed.

Remote Control Through Mobile Device

Systems mentioned above, such as in FIGS. 2-12, include a Bluetooth connection. The caregiver may pair the Bluetooth of the car seat to their mobile device or to the car's computer. The pairing may require authentication and capable of being password protected.

Caregiver may choose to adjust and maneuver the movable features or comfort features of the car seat by remotely adjusting it on their Mobile Application using any mobile. For example, a caregiver may be able to adjust height of the shoulder belts, horizontal spacing of the shoulder belts, movements of the side of the car seat, displacement of the middle-section clip, reclining of the car seat, rotating of the car seat, or adjusting temperature, music, or vibrations of the car seat.

In one instance the caregiver may provide the priority to the car over the automobile settings. For example, if a caregiver prefers to have the child comfortable on a temperature setting that suits the child, in a bi-directional communication system between the car seat and the automobile's computer and navigation panel, the caregiver may authorize the car seat to set the controls of the car, such as temperature settings, fan settings, so that the automobile settings are automatically controlled by the car seat.

Alternatively, the automobile display screen and the automobile computer may also be integrated with the car seat system allowing them to adjust and maneuver the movable features or comfort features through the automobile's display screen.

Alternative to Bluetooth, the car seat system may also be hard wired into the automobile system or any mobile device that is located in the car for allowing the caregiver to adjust and maneuver the movable features or comfort features of the car seat.

Posture Adjustment

Back pain and neck ache are common in children that are constantly exposed to longer drives and have to sit in the car seat daily. In many instances, parent commute 30 minutes to over an hour each way to work and have their child strapped in the car seat for the duration of the ride. Many children complain of back pain, neck pain, and other posture related pains that are caused due to sitting in one position in the car seat for a long time. Longer trips from city to city, long drives on vacation, may cause more discomfort when seated in one position for several hours. Further, there may be certain medical conditions, such as acid reflux, gastroenteritis, or persistent vomiting in infants who have not been growing or developing as expected.

The current invention automatically maneuvers itself to provide for the most comfortable posture position for the child to reduce backache and neck pains. In one instance, the car seat system periodically reclines and moves the car seat in positions such that it's not in one constant position for the entire duration of a long ride. The car seat system may also change lumbar support setting, provide vibrating movements, or provide massage type setting similar to a massage chair by pushing on certain areas of child's neck and back and then retracting.

In another embodiment, the system maneuvers in a position to minimize acid reflux to children by selecting a position that is more comfortable to their condition. Since the system learns over time, it can either automatically adjusts based on experiences, or be programmed the caregiver to have the car seat positioned in a certain setting that is better suited for the child.

Crash Safety

In one embodiment, the car seat system includes sensors that are paired with the car's computer. In the event of a crash, or a hard braking by the car, the car seat system communicates with the car's computer, or its anti-lock braking systems, and goes into crash safety mode. This crash safety mode may include pulling back and tightening the car seat's belts to minimize any gap between the child and shoulder belts for a tighter securing of the child. The system also tilts the headrest of the car seat in the appropriate position such that its closer and touching or a snugger fit with the child's head to reduce whiplash that may be caused by the accident or hard braking.

Further, the system may also tighten a movable horizontal member that is near the hip of the child's body to provide for a tighter and snug protection during an incident or hard brake. Further, the system may also include flaps that protrude out near the head rest of the child and cove the child ear and side of the face. When in crash safety mode, the flaps may bend inwards towards the child's head to minimize the gap between the child's head and the flaps for a snugger fit. The head rest and flaps together may reduce movement of the child's head and whiplash in all directions and the tightening of the belts and the lower hip area may provide a tighter hold of the child.

Additionally, the car seat belts pass through a pretensioner that tightens or grabs the seat belt with its teeth when ma sudden jerk, brake, or movement is detected.

In yet another embodiment, the flaps may include an additional protruding member. This protruding member may be hidden in normal circumstances and protrude outwards in a quick manner when in crash mode. In the event of a glass shattering due to the accident, the protruding member may provide additional protection and a blockage from breakage of the glass from car window adjacent to the child.

In yet another embodiment, the car seat system may utilize the crowd sourcing data obtained through various existing programs, such as Waze (a community based traffic and navigation application), car-to-car communication systems, and technology that alerts and warns of impending collisions between cars based on various parameters, such as speed and probability of collision. The car seat system may utilize this data both for traffic purposes and for collision and crash safety purposes. In the case of traffic, the car seat system may detect road conditions, weather conditions, traffic on the road to determine amount of time taken to complete the ride and adjust the car seat accordingly for a comfortable ride. In the case of impending collision, the car seat system will go into crash safety mode to protect the child as discussed above.

Interlocking Car Seats

Caregivers often place more than one child in the car and thereby use two or more car seats. In the situation of multiple car seats, the space in the back seat of an automobile is limited and often caregivers decide to place car seats immediately next to each other. If there are two car seats, in an automobile that has space for three passenger seating in the back seat, the caregiver may decide to place the two car seats next to each other such that one car seat is by the automobile window and the second car seat is in the middle of the passenger seating area thereby leaving room for an adult or an person not requiring the car seat to be comfortable seated in the third location adjacent by the automobile window.

In a typical scenario where two car seats are placed next to each other, the space in the back seat of the automobile may be further limited by the two car seats taking up most of the space and leaving little to no space for an adult to sit in the third seat location. The reason for this limited space is that two car seats placed next to each other do not properly fit together. Sometimes the handles touch each other and provide a gap between the two car seats, sometimes the cup holders and other protrusions of one car seat rubbed against the other. The second problem in placing two car seats together is that they do not sit straight, or at a 90 degree angles facing the front of the car. Since one car seats obstructs the other, in order to fit both car seats, typically one car seat, or both, are pushed slightly to an angle. Further the locking mechanism in the automobile that latches the car seat push lock is also limited in space and having two car seat locking mechanisms fit in the tight space could take a lot of maneuvering as well as provide a hard fit.

The current invention provides for side structure that properly meshes with the second car seat so that it doesn't leave a large gap in the middle due to obstacles like handles, and cup holder. The car seat includes an interlocking mechanism that allows one car seat to lock to another car seat on their sides thereby reducing the gap, any angle, and also providing for more space in a three-passenger capacity automobile back seat for someone to sit in the third seat.

Likewise, the present invention's interlocking mechanism also provides a better fit if three car seats are placed in an automobile that has a three-car seat capacity in their back seat. The interlocking mechanism properly meshes or aligns the three car seats, minimizes the gap between them, and allows from a snug fit in the automobile.

Additionally, the locking mechanism to the car includes a 2 by 1 locking mechanism. In a typical scenario where two car seats are placed next to each other, the caregiver needs to insert each car seat's locking mechanism, which is a latch or hook of some type, into the automobile's latch or locking metal bracket. Since the automobile's locking metal bracket has limited space, trying to fit two locking mechanisms, one from each car seat, can be difficult and frustrating.

The present invention's a 2 by 1 locking mechanism includes a mechanism that allow provides ample space for two car seat's locking mechanism to be inserted on its one end while on the other end only one locking mechanism is inserted into the automobile's latch or metal bracket.

The 2 by 1 locking mechanism also includes a belt latch tightening system. This belt latch tightening system may pull the car seat latching mechanisms tighter together by the push of a button and also release them when needed. Instead of the caregiver wrestling to tighten the car seat's lathing mechanism with the automobile's latch by pulling the latching belts, and then again struggling to untighten them when desiring to unlock the car seat from the latch, the 2 by 1 locking mechanism pulls and locks with appropriate tension engagement by the push of a button. The same push of a button releases the belts making it easier for the caregiver to remove the car seats.

Wet Seat Detection

In one embodiment, the car seat includes sensors that can detect a wet condition and odors. The sensors can detect if the car seat is wet, e.g. due to water deposit of any kind, as well as if a certain odor relating to defecation or dirty diaper is detected. If such a condition is sensed, the system then provides an alert to the caregiver. The alert may be audible, send to the navigation panel, or to the smart phone. The alert may also be some preset music or phrase used.

The car seat system may also include fans and heating system underneath its base section to automatically dry out the liquid deposited in the base to alleviate a wet car seat condition.

Network of Car Seats

In another embodiment, the car seat is connected to another car seat through a network. The network may be a LAN/Wan network or a wireless network or a cloud network. This interconnected network may allow caregivers to store profiles, comfort settings, and safety setting particular to a specific child such that is the child is placed in a separate car sat or in another automobile having a networked car seat, then the loaded profile may be recognized and automatically the separate car seat adjusted to the child's profile. This would alleviate the need to configure separate car seats for the same child.

Figure 13:
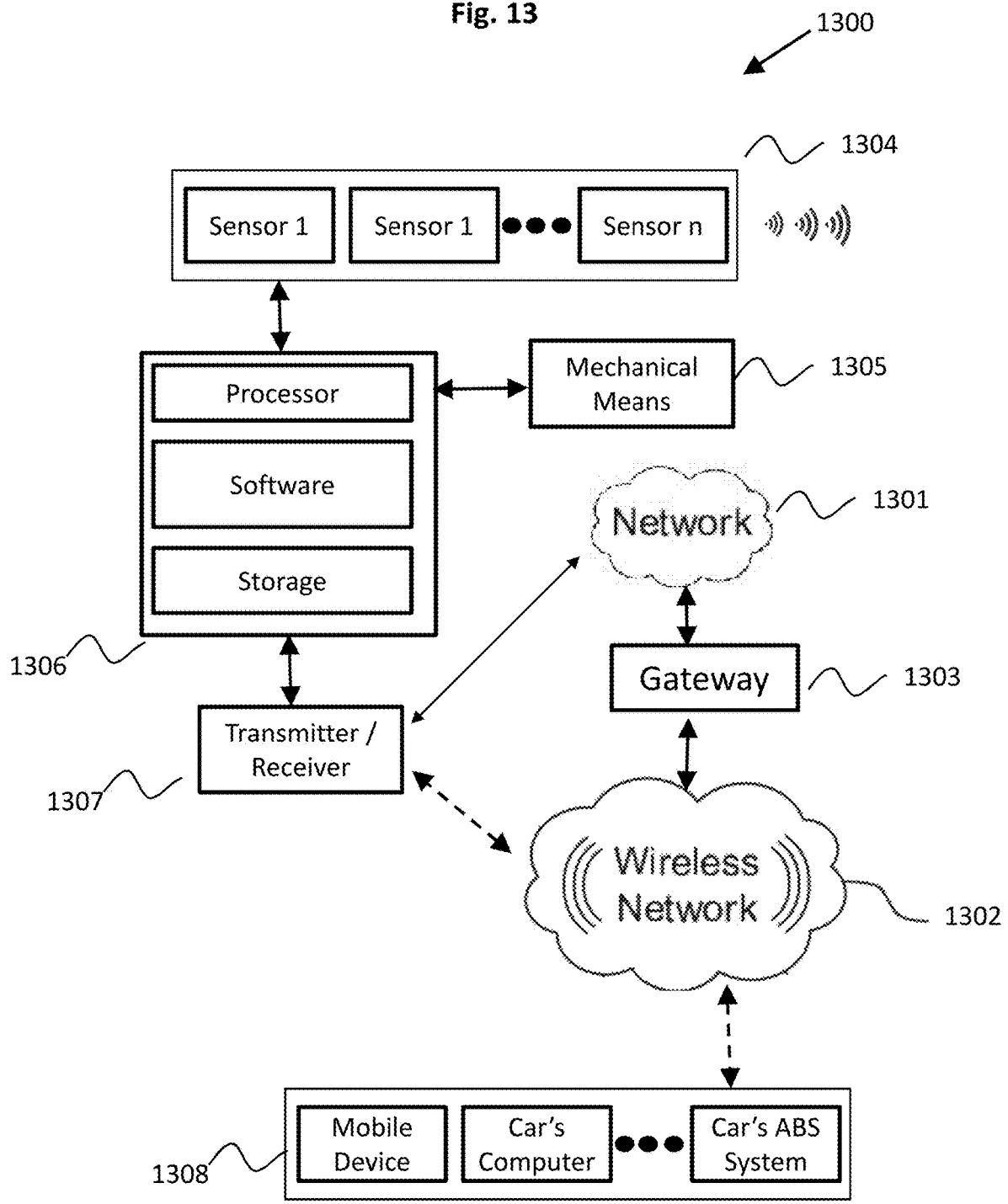
FIG. 13 illustrates a system and a wireless network used in the present invention.

FIG. 13 illustrates one embodiment of a system and a wireless network used in the present invention. The system depicts a managed service provider system 1300 for managing the car seat's movable means, adjustment controls, comfort features, wet seat detection, rotating features and items discussed in FIGS. 2-12. Other components may be included in system 1300 not shown in FIG. 13. The disclosure of FIG. 13 is shown for clarity and may include any of these additional components to perform the functionality disclosed herein.

System 1300 may include local area networks (LAN) and wide area network (WAN) shown as network 1301 and wireless network 1302. Gateway 1303 is configured to connect remote or different types of networks together, as well as computing devices 1304-1308.

Computing devices 1304-1308 may include any device capable of receiving and sending data over a network, such as wireless network 1302. Computing devices may include sensors, portable devices such as cellular telephones, smart phones, radio frequency-enabled devices, personal digital assistants, handheld computers, tablets, laptop computers, wearable computers and the like. Computing devices also may include any computing device that connects to a network using a wired communications medium such as personal computers, multiprocessor systems, microprocessor-based or programmable consumer electronics, network personal computers and the like.

Computing devices 1304-1308 also may be web-enabled client devices that include a browser application configured to receive and to send web pages, web-based messages and the like. The browser application may be configured to receive and display graphic, text, multimedia, or the like, employing virtually any web based language, including a wireless application protocol messages (WAP), or the like. In one embodiment, the browser application may be enabled to employ one or more of Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Computing devices 1304-1308 also may include at least one other client application that is configured to receive content from another computing device, including, without limit, server Computing devices 1304-1308. The client application may include a capability to provide and receive textual content, multimedia information, or the like. The client application may further provide information that identifies itself, including a type, capability, name, or the like. In one embodiment, Computing devices 1304-1308 may uniquely identify themselves through any of a variety of mechanisms, including a phone number, mobile identification number (MIN), an electronic serial number (ESN), mobile device identifier, network address, such as IP (Internet Protocol) address, media access control (MAC) layer identifier, or other identifier. The identifier may be provided in a message, or the like, sent to another computing device.

Computing devices 1304-1308 may also be configured to communicate a message, such as through email, short message service (SMS), multimedia message service (MMS), instant messaging (IM), internet relay chat (IRC), Mardam-Bey's IRC (mIRC), Jabber, or the like, to another computing device.

Computing devices 1304-1308 may further be configured to include a client application that enables the user to log into a user account that may be managed by another computing device. Such a user account, for example, may be configured to enable the user to receive emails, send/receive IM messages, SMS messages, and access selected web pages, download scripts, applications, or a variety of other content, or perform a variety of other actions over a network. Management of messages or otherwise accessing and/or downloading content, may also be performed without logging into the user account. Thus, a user of computing devices 1304-1308 may employ any of a variety of client applications to access content, read web pages, receive/send messages, or the like.

In one embodiment, for example, the user may employ a browser or other client application to access a web page hosted by a Web server implemented as Computing devices 1304-1308. Messages received by computing devices 1304-1308 may be saved in non-volatile memory, such as flash and/or PCM, across communication sessions and/or between power computing devices 1304-1308.

Wireless network 1302 wireless network may be configured to couple client devices 1304-1307 to network 1301. Wireless network 1302 may include any of a variety of wireless sub-networks that may further overlay stand-alone ad-hoc networks, and the like, to provide an infrastructure-oriented connection for devices 1304-1307. Such sub-networks may include mesh networks, Wireless LAN (WLAN) networks, cellular networks, and the like. Wireless network 1302 may further include an autonomous system of terminals, gateways, routers, and the like connected by wireless radio links, and the like. These connectors may be configured to move freely and randomly and organize themselves arbitrarily, such that the topology of wireless network 1302 may change rapidly.

Wireless network 1302 may further employ a plurality of access technologies including 2nd (2G), 3rd (3G), 4th (4G), 5th (5G) and the like generation radio access for cellular systems, WLAN, Wireless Router (WR) mesh, and the like. Access technologies such as 2G, 3G, 4G, 5G and future access networks may enable wide area coverage for mobile devices, such as devices 1304-1308 with various degrees of mobility. For example, wireless network 1302 may enable a radio connection through a radio network access such as global system for mobile communication (GSM), general packet radio services (GPRS), enhanced data GSM environment (EDGE), WEDGE, Bluetooth, high speed downlink packet access (HSDPA), universal mobile telecommunications system (UMTS), Wi-Fi, Zigbee, wideband code division multiple access (WCDMA), and the like. In essence, wireless network 1302 may include virtually any wireless communication mechanism by which information may travel between devices 1304-1308 and another computing device, network, and the like.

Network 1301 is enabled to employ any form of computer readable media for communicating information from one electronic device to another. Network 1301 also may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Network 1301 may include any communication method by which information may travel between computing devices. Additionally, communication media typically may enable transmission of computer-readable instructions, data structures, program modules, or other types of content, virtually without limit. By way of example, communication media includes wired media such as twisted pair, coaxial cable, fiber optics, wave guides, and other wired media and wireless media such as acoustic, RF, infrared, and other wireless media.

System 1300 may connect all components 1301-1308 such that bi-directional communication is possible between the car seat, including its modules and sensors, and an external device (mobile device, automobile computer, navigation system. Automobile display system).

In addition to the types of networks discussed above, the network may also be a cloud network allowing communications through the cloud while ensuring data privacy, authentication, and protection.

Figure 14:
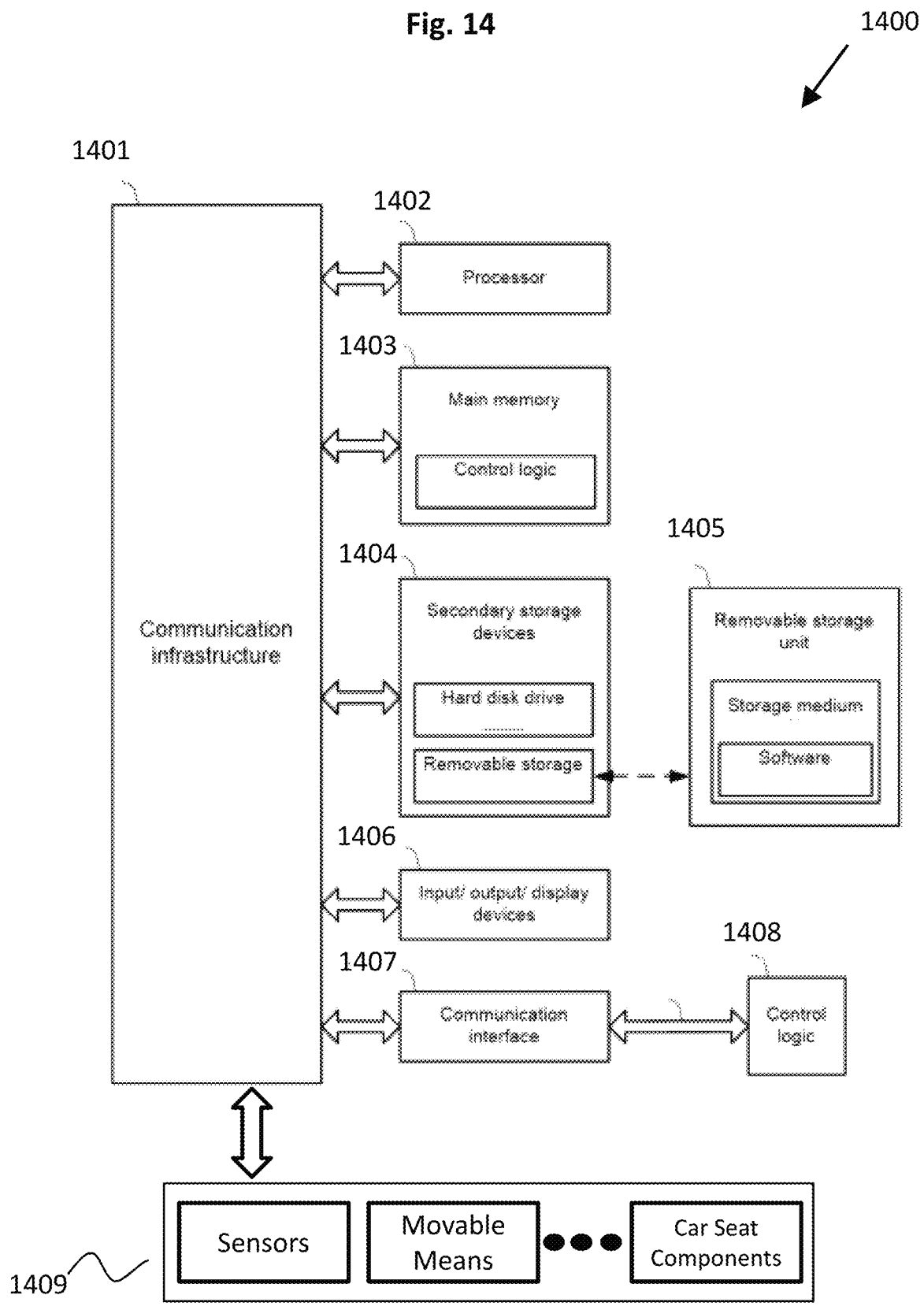
FIG. 14 illustrates a system used in the present invention.

FIG. 14 illustrates a system used in the present invention. System 1400 includes a communication infrastructure 1401, a processor 1402, a main memory 1403, which may be disc or SSD memory, secondary storage devices 1404, a removable storage unit 1405, input/output display devices 1406, communication interface 1407, control logic 1408, and car seat modules 1409 that include sensors, movable means, and other car seat components discussed above. System 1400 allows bi-directional communication between components 1401-1409. The system also allows storage of data, storage of preferences, storage of data related to artificial intelligence and learning, and data for safety and comfort settings in its main memory 1403 or secondary storage 1404 or removable storage 1405.

Control logic 1408 helps navigate the automated setting and determine best suitable car seat adjustment for the child's safety and comfort.

Communications with Manufacturer

The networked car seat mentioned in FIGS. 13 and 14 is also capable of communicating directly with the manufacturer, distributor, or dealer of the car seat. This would allow the manufacturer, distributor to directly push notifications, updates, and enhancements to the car seats. It would also allow remote detection and possible repairs. It would also allow the manufacturer, distributor to provide recall updates or be notified in case of an accident to ensure the car seat continues to meet safety requirements after it has been in a car accident.

Often, once a car seat is in an automobile accident, it is deformed or affected, dented or some module may not be functioning as required. The present invention has two methods of determining if the car seat continues to meet safety standards after an accident.

In one embodiment, the car seat sensors and systems may run through an automated safety check and respond with an alert to the caregiver if the car seat continues to be safe to use. For example, if the car seat suffered minimal damage, or cosmetic damage that would still allow it to be used safely, then the system would alert the caregiver as it's safe to use. Likewise, if some electronic or mechanical or structural components have failed due to an accidents, or due to wear and tear, then the car seat would alert the caregiver that the car seat is no longer safe to use or provide an error code identifying the areas that need updates for it to comply with safety standards.

In another embodiment, the car seat may communicate directly with the manufacturer, distributor, or dealer of the car seat and provide the data of an accident or wear and tear allowing the manufacturer, distributor, or dealer of the car seat to take appropriate measures.

Autonomous Vehicle

Self-driving and autonomous cars are becoming popular and more common. The seating arrangement in a self-driving and autonomous car may differ from the conventional seating in the car used in current and past times. The car seat system is adaptable to the self-driving and autonomous cars by being placed in various alternative positions and angles within the car. The car seat system would be capable of applying the same safety and comfort principles as discussed above with different seating configurations in which a car seat may be placed in a self-driving and autonomous car. The car seat system may also be a standalone unit inside a self-driving and autonomous car such that it is capable of being moved about inside the automobile and also be capable of being locked into position. The car seat standalone system may be on a track placed on the floor of the automobile or around the inside of the automobile. In one instance the car seat system may have a full 360 degrees moving capability and capable of being locked into any position through an arm that extends from the car seat system and attached or movably attached to the inside of the self-driving and autonomous car. The car seat may also communicate with various electronic modules, games, and other electronic and mechanical features inside the self-driving and autonomous car to provide for a better ride experience for the child.

GPS Monitoring and Security Alerts

Referring back to FIG. 2, the car seat 200 includes a Global Positioning Sensor (GPS). The GPS provides details of the location, including the coordinates of the location of the car seat 200. The GPS can be communicatively connected to a mobile application that can be downloaded on a mobile phone, tablet, or an electronic device that allows downloading of an Application. The APP may have authentication and authorization features that allows access to the location data produced by the GPS to selected users that are approved and allowed to access the data. Such authentication and authorizations preferences may be managed through the APP by the owner/user such that they can provide different tiers of access to different users.

The car seat 200 may also include a fingerprint scanner (not shown). The fingerprint scanner is used for scanning the fingerprint of a child that is seated in the car seat 200. The fingerprint scanner reports the data to system which can then report the data to an authorized user through a mobile Application. The fingerprint scanner together with GPS can be used to know a real-time location of a child. This feature would really come in use especially when your child is being picked up from school and taken to an after-school activity, being transported by an UBER or an UBER-like service, being transported by a nanny or other authorized caregiver.

The Application includes security features that allow enhanced monitoring, location detection, and security features that can be customized by the user. For example, a parent may allow the transport of their child Fred, from Fred's elementary school to his Piano Class. In this scenarios, let's suppose that Fred is to be picked up by a UBER-like car service, or a nanny, from his elementary school at 3.30 PM and his Piano Class starts at 4 PM.

The Application allows the user to input the pickup and drop off location for Fred. In this scenario, it would be pick up at Address 1 (Elementary School) and drop off at Address 2 (Piano Class). The Application would use maps and other resources to calculate the best route to go from Address 1 to Address 2. The Application would also take into account traffic and other data from crowd sourcing platforms. Once the child has been picked up at Address 1, the child's fingerprint is scanned and confirmed. The confirmation is to ensure that Fred is the child that has been picked up. The Application then times the ride, calculates the route, and also provides data on the ride, such as seat belt being locked and unopened during the ride etc. If the drive of the car deviates from the path, or deviates more than 5% or some allowable percentage from the path, or takes an alternative route that does not proceed in the direction of Address 2, then an alert is sent to the user's electronic device. Likewise, if the amount of time between Address 1 and Address 2 is longer than calculated, or if longer than an allowable percentage of calculation, then an Alert is sent. The user can program the amount of deviation in routing and time to provide some flexibility as well. Since the Application takes into account the traffic, accidents, any abnormal times on the particular route, the Application takes into account any additions in time or detours before sending out an Alert. Alternatively, a user may choose to receive the alert despite the allowable delays and detours. The security mechanisms allow a parent to have their child picked up, ensure their safety and security while monitoring them in real-time. Other Applications alerts and setting are also contemplated.

In one embodiment, since the car seat is wired with sensors and other monitoring means described above, including speakers, microphones, and cameras as well as GPS, heart monitoring, wet seat detection, and other child temperature and metrics taking devices, the invention allows data gathering on the child during the car ride and the secured data can be used for building additional monitoring, security, heath, educational and communication applications. For example, a sound recognition may allow the child to select and play a song, a movie, or call their loved ones either as needed or in case of an emergency an automatic call may also be placed with the live video and audio to the caretakers, parents, or authorities or emergency services. Further, in the event the child is being transported to a hospital or clinic, live child vitals and other data may be gathered and provided in real-time to the clinics, hospitals, or doctors that may aid them to be equipped and ready by the time the child arrives at their location. Additional limited cellular capabilities may also be added.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims. For example, various moving mechanical components have been discussed to be powered by a motor. The motor may be powered through a variety of means, such as battery, hardwired to cigarette lighter, solar power, or wind power.

I claim:

1. A method of automatically displacing a movable component of a child car seat, wherein the car seat is placed and secured inside an automobile, and a child is placed inside the car seat, comprising:
   detecting the presence of a child placed inside a car seat, wherein said detection is performed by utilizing a plurality of sensors attached to the car seat;
   measuring a portion of the child's body that is placed within the car seat, wherein said measurement is performed by utilizing the plurality of sensors placed inside the car seat;
   detecting the current location of a movable component of the car seat;
   analyzing the relationship between the current location of the movable component of the car seat and the measurement of the portion of the child's body that is placed inside the car seat, wherein the analyzing results in determining a distance that the movable component has to be displaced such that its displaced location is within either safety guidelines of the car seat or preferred settings; and
   automatically displacing the movable component of the car seat.

2. The method of claim 1, wherein the movable component is the seat belt of the car seat, wherein the measurement performed by the plurality of sensors includes a measurement of the child's chest area, the method further comprises:
   determining the pressure applied by the seat belt in the child's chest area;
   automatically displace the seat belt from a first position to a second position such that the pressure applied by the seat belt in the child's chest area is based on the thickness of the child's chest area; and
   lock the seat belt after it is displaced to the second position.

3. The method of claim 2, wherein determining the thickness in the child's chest area comprises obtaining a base thickness reading of the child's chest area, wherein the base reading determines the placement of the seat belt such that it applies a pressure on the child's chest area to securely fasten the seat belt and minimize the forward movement of the child's chest area during the car ride, wherein the base reading is obtained when the child is wearing no clothing or a clothing having a thickness of less than 45 millimeters average thickness.

4. The method of claim 3, wherein determining the thickness in the child's chest area comprises
   obtaining the measurement of the base thickness of the child's chest area,
   obtaining a second measurement of the clothing worn by the same child at the time the child is placed in the car seat,
   comparing the base thickness to the second measurement, and determining the displacement of the seat belt such that, once displaced, the seat belt applies a pressure on the child's chest area to securely fasten the seat belt and minimize the forward movement of the child's chest area during the car ride.

5. The method of claim 4, wherein the seat belt is displaced such that it accommodates for a thick piece of clothing, such as a sweater or a jacket, worn by the child and applies a pressure to tighten the seat belt in the chest area during the car ride.

6. The method of claim 2, wherein the amount of displacement of the seat belt is determined by the amount of pressure that is to applied to the child's chest area by the seat belt.

7. The method of claim 2, wherein displacing the seat belt from a first position to a second position comprises determining the measurement of the child's chest area, which includes, the one or more layers of clothing worn by the child, and displacing the seat belt to apply pressure in the child's chest area while accommodating the thickness of the one or more layers of clothing worn by the child.

8. The method of claim 1, further comprising locking the movable components after it is displaced to its final position such that is not capable of further movement.

9. The method of claim 1, wherein, measuring a portion of the child's body resulting in associating a marker that identifies the horizontal and vertical position of a certain body member of the child's body.

10. The method of claim 9, wherein, the marker may identify the location of the top of the child's shoulder, or the top of the child's head, or the width of the child's neck, or the width of the child's shoulders, or the width of the child's waist, or the width of the child's hip, or the depth of the child's chest, of the depth of the child's stomach in relation to the location of the car seat.

11. The method of claim 1, further comprising:
    receiving data that correlates to an incident, wherein the incident is an accident, a hit to the car, a hard brake, or an anticipated braking applied by the automobile;
    in response to the data received, entering an incident detection and protection mode that results in displacing the movable component to tightly snug the child placed in the car seat for protecting the child's body and minimizing the impact of the incident on the child.

12. The method of claim 11, wherein the child's car seat is in electronic communication with the automobile's computer and the car seat receives the data from the automobile's computer.

13. The method of claim 11, wherein the incident detection and protection mode results in tightening of the car seat belt and applying additional pressure to the child's chest area.

14. The method of claim 11, wherein the incident detection and protection mode results in inward movement of the flaps that surround the child's head area.

15. The method of claim 11, wherein the incident detection and protection mode results in inward movement of the structure of the car seat that surrounds the child's hip area.

16. The method of claim 1, wherein detecting the presence of a child placed inside a car seat includes using a fingerprint scanner to scan the child's fingerprints and sending the scanned data for analysis.

17. The method of claim 1, further comprising automatically reclining the child car seat, wherein the automatic reclining comprises:
    receiving a signal to recline; and
    in response to the signal, automatically moving a movable component of the car seat to recline the car seat to a desired angle, and locking the car seat in a reclined position.

18. The method of claim 1, further comprising:
    receiving a signal to displace an expandable section located in the lower part of the car seat, wherein the car seat includes a base, a back, a headrest, sides for placing a child within the car seat, a pair of shoulder belts and a harness, wherein the pair of shoulder belts have a middle-section clips for locking the pair of shoulder belts to each other, a locking mechanism that secures the car seat with the automobile such that there is minimal movement between the car seat and automobile's backrest once the locking mechanism is locked in place, a movable means for allowing inward and outward movement resulting in expansion and contraction of the expandable section, a plurality of sensors placed at various locations within the car seat; and in response to the signal, activating a computing module associated with the car seat for obtaining data from the sensors and automatically displacing the car seat shoulder belts, the middle-section clip, and the expandable section.

19. The method of claim 18, further comprising activating a learning module, wherein the learning module is part of a computing module that is associated with the car seat, wherein activating the learning module comprises:

obtaining data from the plurality of sensors placed in the car seat for each car ride taken by the child in the car seat;

storing the data in memory of the computing module;

analyzing the data from each car ride to determine repetitions, common settings, and preferred setting of the car seat's movable components;

and automatically changing the car seat's movable components for future rides taken by the child.

20. The method of claim 1, wherein, measuring a portion of the child's body includes measuring the child's shoulder height, wherein, the movable component is a car seat belt, wherein the seat belt is vertically displaced to match the measured shoulder height of the child.

21. A method of automatically reclining a child car seat, wherein the car seat is placed and secured inside an automobile, and a child is placed inside the car seat, comprising:

receiving a signal to recline the child car seat, wherein the child car seat includes a plurality of sensors and the signal to recline can be received in response to data provided by the plurality of sensors;

in response to the signal, automatically displacing a movable component of the car seat to recline the car seat to a desired angle; and locking the car seat in a reclined position.

22. The method of automatically reclining a child car seat of claim 21, wherein the signal to recline is received in response to a positive determination that the child placed in the child car seat is sleeping.

23. The method of automatically reclining a child car seat of claim 21, wherein the signal to recline is received from an electronic device or an automobile's system.

24. The method of automatically reclining a child car seat of claim 21, further comprising, determining if a child is sleeping in the child car seat, wherein said determination is made through data obtained from a sensor placed in the child car seat that indicate a sleep mode.

25. The method of automatically reclining a child car seat of claim 21, further comprising obtaining data relating to the child's sleep patterns obtained through past automobile rides and reclining the child car seat to a desired position based upon data obtained.

26. The method of automatically reclining a child car seat of claim 21, further comprising coupling the movable upper housing of the child car seat to the lower base of the child car seat, wherein the upper housing can be displaced, wherein the displacement includes, lateral movement, rotational movement, or a combination of lateral and rotational movement to recline at an angle while being connected to the lower base of the child car seat;

using a guided track to couple the movable upper housing to the lower base of the child car seat;

and displacing the upper housing along the guided track to recline at a desired angle.

27. A child-restraint car seat comprising:

a structure having a base, a back, a headrest, and sides for placing a child within the car seat, wherein the base is either movably or detachably connected to the back, wherein the back is movably or detachably connected to the headrest, and wherein the sides are either movably or detachably connected to the base;

a pair of shoulder belts and a harness, wherein the pair of shoulder belts have a middle-section clips for locking the pair of shoulder belts to each other, wherein the pair of shoulder belts and harness are either movably or detachably connected to the structure;

a locking mechanism that secures the car seat with the automobile such that there is minimal movement between the car seat and the automobile's backrest once the locking mechanism is locked in place;

an expandable section located in the lower part of the car seat, wherein the lower part is the area where the child's hip and bottom rests within the car seat;

a movable means for allowing inward and outward movement resulting in expansion and contraction of the expandable section;

a plurality of sensors placed at various locations within the structure; and a computing module for obtaining data from the sensors and automatically displacing the car seat shoulder belts, the middle-section clip, and the expandable section.

28. A method of automated learning in a child car seat environment, wherein the car seat is placed and secured inside an automobile, and a child is placed inside the car seat, comprising:

obtaining data from a plurality of sensors placed in the car seat for each ride taken by the child in the car seat;

storing the data in memory;

analyzing the data from each ride to determine repetitions, common settings, and preferred setting of the car seat's movable components;

and automatically changing the car seat movable components for future rides taken by the child.

29. The method of claim 28, wherein, the car seat movable component includes a car seat belt, shoulder belts, middle-section clips of the shoulder belts, an expandable section located in the lower part of the car seat, a car seat reclining component that reclines the car seat, or a car seat rotating component.

* * * * *